(12) United States Patent
Xiong et al.

(10) Patent No.: US 10,841,978 B2
(45) Date of Patent: Nov. 17, 2020

(54) ENHANCED SELF-CONTAINED TIME-DIVISION DUPLEX SUBFRAME STRUCTURE

(71) Applicant: APPLE INC., Cupertino, CA (US)

(72) Inventors: Gang Xiong, Portland, OR (US); Huaning Niu, San Jose, CA (US); Hong He, Sunnyvale, CA (US); Jong-Kae Fwu, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 406 days.

(21) Appl. No.: 15/762,534

(22) PCT Filed: Apr. 1, 2016

(86) PCT No.: PCT/US2016/025737
§ 371 (c)(1),
(2) Date: Mar. 22, 2018

(87) PCT Pub. No.: WO2017/062062
PCT Pub. Date: Apr. 13, 2017

(65) Prior Publication Data
US 2020/0260527 A1    Aug. 13, 2020

Related U.S. Application Data

(60) Provisional application No. 62/239,044, filed on Oct. 8, 2015.

(51) Int. Cl.
*H04W 88/10* (2009.01)
*H04L 27/26* (2006.01)
(Continued)

(52) U.S. Cl.
CPC ........... *H04W 88/10* (2013.01); *H04L 1/1819* (2013.01); *H04L 5/0051* (2013.01);
(Continued)

(58) Field of Classification Search
CPC ........... H04W 72/085; H04W 72/0446; H04W 72/0413; H04L 5/14; H04L 1/1854; H04L 5/0007; H04B 7/2656
See application file for complete search history.

(56) References Cited

U.S. PATENT DOCUMENTS

| | | | |
|---|---|---|---|
| 2009/0116427 A1* | 5/2009 | Marks | H04W 72/0453 370/328 |
| 2011/0235555 A1 | 9/2011 | Zhang et al. | |

(Continued)

OTHER PUBLICATIONS

On the TDD Subframe Strcuture for Beyong 4G Radio Access Network by Eeva et al. (Year: 2013).*

(Continued)

*Primary Examiner* — Dady Chery
(74) *Attorney, Agent, or Firm* — Stoel Rives LLP

(57) ABSTRACT

Technology for an eNodeB to communicate with a user equipment (UE) using a self-contained time division duplex (TDD) subframe within a wireless communication network is disclosed. The eNodeB can process, for transmission to the UE, a DL self-contained time division duplex (TDD) subframe comprising an extended physical downlink shared channel (xPDSCH), an extended physical downlink control channel (xPDCCH), a downlink (DL) spacing signal, and a guard period, wherein the xPDSCH, the xPDCCH, the DL spacing signal, and the guard time are located within the DL self-contained TDD subframe prior to an extended physical uplink control channel (xPUCCH). The eNodeB can process, an uplink (UL) self-contained TDD subframe, received from the UE, having a UL spacing signal located after an extended physical uplink shared channel (xPUSCH).

30 Claims, 18 Drawing Sheets

(51) Int. Cl.
  *H04L 5/14* (2006.01)
  *H04W 72/04* (2009.01)
  *H04W 76/27* (2018.01)
  *H04L 1/18* (2006.01)
  *H04L 5/10* (2006.01)
  *H04L 5/00* (2006.01)
  *H04W 56/00* (2009.01)

(52) U.S. Cl.
  CPC .............. *H04L 5/0055* (2013.01); *H04L 5/10* (2013.01); *H04L 5/1469* (2013.01); *H04L 27/2607* (2013.01); *H04W 56/001* (2013.01); *H04W 72/0446* (2013.01); *H04W 76/27* (2018.02)

(56) References Cited

U.S. PATENT DOCUMENTS

| | | | | |
|---|---|---|---|---|
| 2011/0249578 | A1* | 10/2011 | Nayeb Nazar | H04W 72/10 370/252 |
| 2011/0310759 | A1* | 12/2011 | Gerstenberger | H04L 5/0055 370/252 |
| 2012/0014320 | A1* | 1/2012 | Nam | H04L 5/0016 370/328 |
| 2013/0322308 | A1 | 12/2013 | Yu et al. | |
| 2014/0321416 | A1* | 10/2014 | Pragada | H04W 76/14 370/329 |
| 2014/0364079 | A1* | 12/2014 | DiFazio | H04W 8/22 455/404.1 |
| 2018/0063820 | A1* | 3/2018 | Xiong | H04W 72/042 |
| 2019/0280820 | A1* | 9/2019 | Kim | H04L 5/14 |
| 2019/0335478 | A1* | 10/2019 | Xiong | H04B 7/2656 |

OTHER PUBLICATIONS

3GPP TS 36.211 V8.5.0; 3rd Generation Partnership Project; Technical Specification Group Radio Access Network; Evolved Universal Terrestrial Radio Access (E-UTRA); Physical Channels and Modulation (Release 8); (Dec. 2008).

Tiedemann; 5G: The Next Generation (Big Wave) of Wireless; Qualcomm; 5G Tokyo Bay Summit; Jul. 22, 2015; retrieved from the internet: URL:https://www.nttdocomo.co.jp/binary/pdf/corporate/technology/rd/tech/5g/NTTDOCOMO_5G_TBS_lecture6.pdf; p. 10.

\* cited by examiner

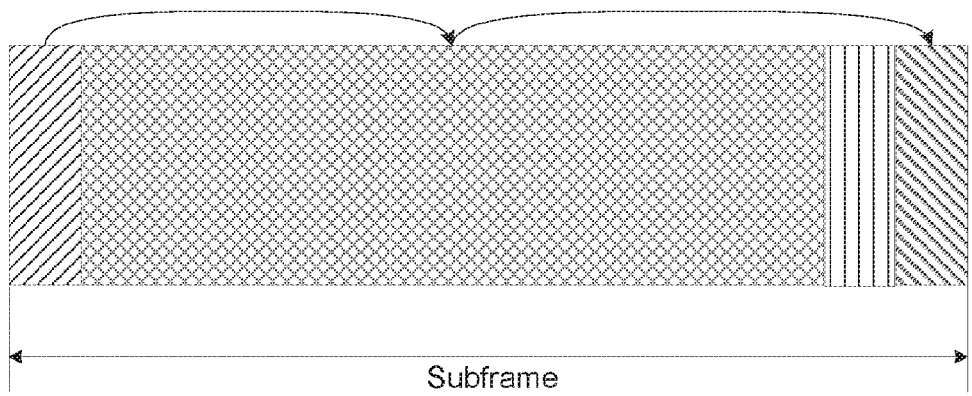
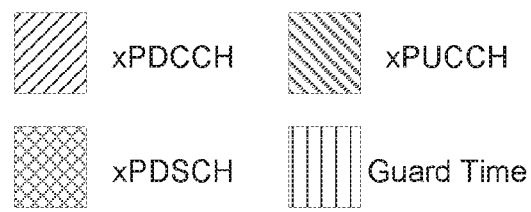
FIG. 3
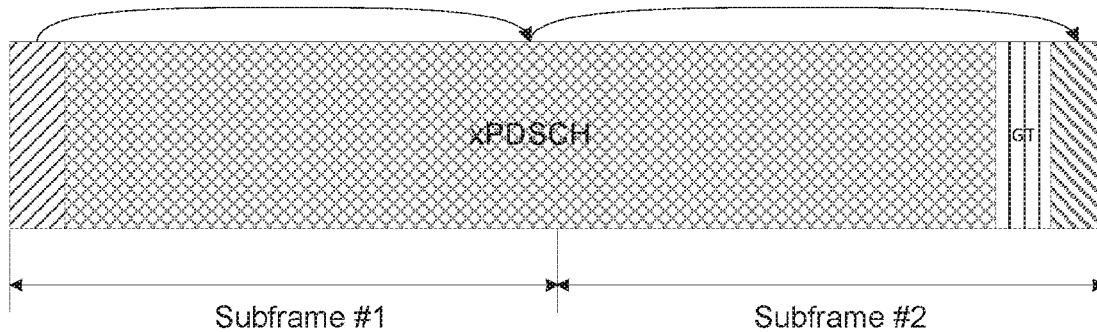
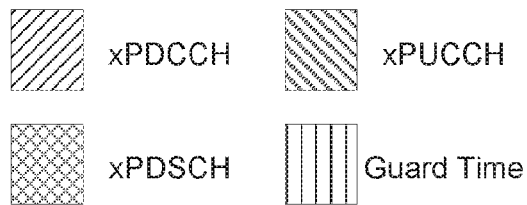
FIG. 4

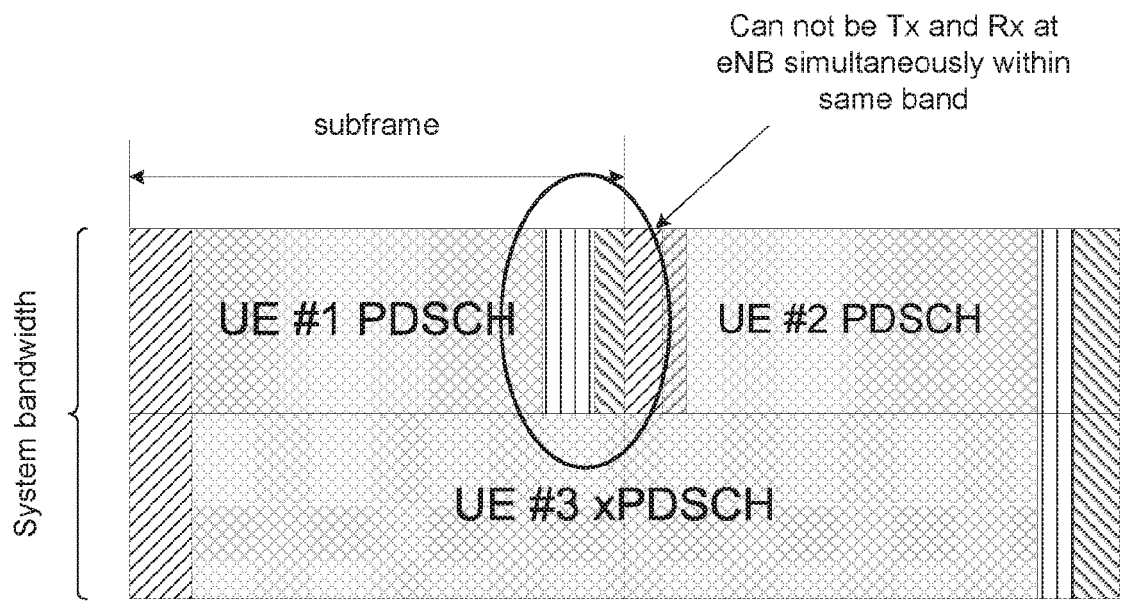
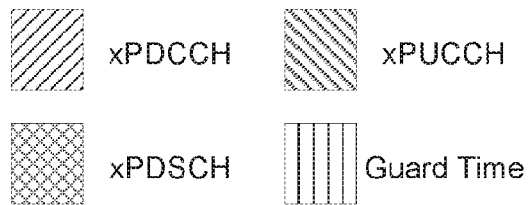
FIG. 5

1400

Generate, for transmission to the UE, a DL self-contained time division duplex (TDD) subframe comprising an extended physical downlink shared channel (xPDSCH), an extended physical downlink control channel (xPDCCH), a downlink (DL) spacing signal, and a guard time, wherein the xPDSCH, the xPDCCH, the DL spacing signal, and the guard time are located within the DL self-contained TDD subframe prior to an extended physical uplink control channel (xPUCCH) — 1410

Process, an uplink (UL) self-contained TDD subframe, received from the UE, having a UL spacing signal located after an extended physical uplink shared channel (xPUSCH) — 1420

Process a DL self-contained time division duplex (TDD) subframe, received from the eNodeB, comprising an extended physical downlink shared channel (xPDSCH), an extended physical downlink control channel (xPDCCH), a downlink (DL) spacing signal, and a guard period, wherein the xPDSCH, the xPDCCH, the DL spacing signal, and the guard period are located within the DL self-contained TDD subframe prior to an extended physical uplink control channel (xPUCCH) — 1510

Generate, for transmission to the eNodeB, an uplink (UL) self-contained TDD subframe after an extended physical uplink shared channel (xPUSCH) having an UL spacing signal located after an extendedphysical uplink shared channel (xPUSCH) — 1520

1610 — Generate, for transmission to the UE, a DL self-contained time division duplex (TDD) subframe comprising an extended physical downlink shared channel (xPDSCH), an extended physical downlink control channel (xPDCCH), a downlink (DL) spacing signal, and a guard period, wherein the xPDSCH, the xPDCCH, the DL spacing signal, and the guard time are located within the DL self-contained TDD subframe prior to an extended physical uplink control channel (xPUCCH)

1620 — Process, an uplink (UL) self-contained TDD subframe, received from the UE, having a UL spacing signal located after an extended physical uplink shared channel (xPUSCH)

1630 — Schedule DL data transmission and UL data transmission using aggregated self-contained TDD subframes upon data transmission traffic exceeding a defined threshold

1640 — Process, for transmission to the UE, an indication for using the aggregated self-contained TDD subframes

FIG. 16

ENHANCED SELF-CONTAINED TIME-DIVISION DUPLEX SUBFRAME STRUCTURE

BACKGROUND

Wireless mobile communication technology uses various standards and protocols to transmit data between a node (e.g., a transmission station such as an eNodeB) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node to the wireless device (e.g., UE), and the uplink (UL) transmission can be a communication from the wireless device to the node.

Currently, a longer Hybrid automatic repeat request (HARQ) acknowledgement (HARQ-ACK) transmission latency is expected for certain downlink (DL) and uplink (UL) configurations for Time-Division Duplex (TDD) system compared to FDD system. This is primarily due to the fact that the DL or UL subframe may not be available at the time for HARQ-ACK transmission. Accordingly, it is desired to provide for a solution to provide functionality and protocols scalable and efficient to reduce the longer HARQ-ACK transmission latency, and enable downlink (DL) and/or Uplink (UL) traffic adaptation.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3 illustrates a downlink (DL) self-contained time division duplex (TDD) subframe in accordance with an example;

FIG. 4 illustrates a self-contained time division duplex (TDD) subframe aggregation in the downlink (DL) in accordance with an example;

FIG. 5 illustrates issues of self-contained time division duplex (TDD) subframes with different aggregation levels in accordance with an example;

FIG. 14 depicts additional functionality of an eNodeB operable to communicate with a User Equipment (UE), within a wireless communication network, using a self-contained time division duplex (TDD) subframe;

FIG. 15 depicts functionality of a user equipment (UE) to communicate with an eNodeB, within a wireless communication network, using a self-contained time division duplex (TDD) subframe in accordance with an example;

FIG. 16 depicts additional functionality of an eNodeB operable to communicate with a User Equipment (UE), within a wireless communication network, using a self-contained time division duplex (TDD) subframe;

Figure 1:
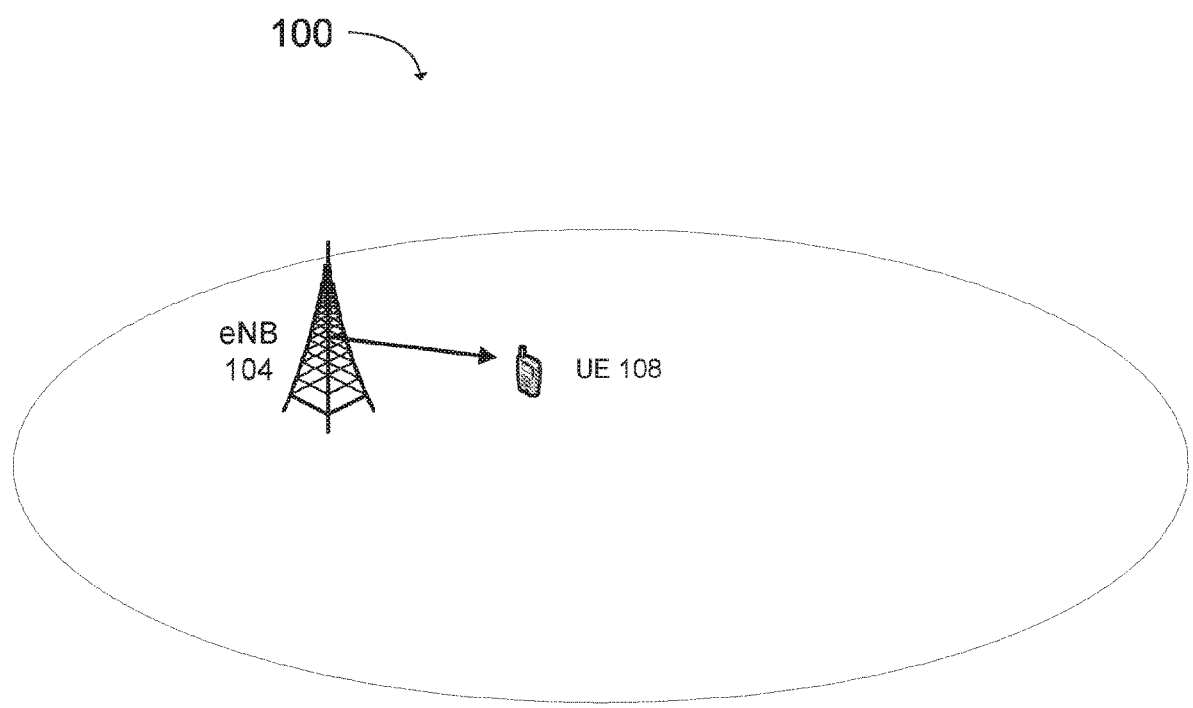
FIG. 1 illustrates a mobile communication network within a cell in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communication has evolved significantly from early voice systems to today's highly sophisticated integrated communication platform. Third generation partnership project (3GPP) next generation wireless communication system fifth generation (5G) can provide access to information and sharing of data anywhere, anytime by various users and applications. In one aspect, 5G can be a unified network/system targeted to meet vastly different, and often times conflicting, performance dimensions and services. Such diverse multi-dimensional constraints can be driven by different services and applications.

In one aspect, 5G can be based on 3GPP long term evolution (LTE)-Advanced (Adv.) ("3GPP LTE-Adv."), such as Rel. 10, 11, or 12, with additional potential new Radio Access Technologies (RATs) providing a user with an enriched experience with efficient and seamless wireless connectivity solutions. In one aspect, 5G can enable delivering fast, efficient, and optimized content and services for everything connected within a wireless network.

However, in existing LTE specifications, such as Rel. 12, longer Hybrid automatic repeat request (HARQ) acknowledgement (HARQ-ACK) transmission latency can be expected for certain downlink (DL) and uplink (UL) configurations for Time-Division Duplex (TDD) system compared to a frequency division duplex (FDD) system. The longer HARQ-ACK transmission latency can be primarily due to the fact that the DL or UL subframe may not be available at the time for HARQ-ACK transmission.

Thus, in one aspect, in order to reduce the latency for HARQ-ACK transmission in a TDD system, an UL control channel can be inserted in one or more subframes within one frame. This flexible duplex TDD structure can also help to enable subframe-level fast DL/UL traffic adaptation to increase the spectrum efficiency. Moreover, to further reduce HARQ-ACK transmission latency, HARQ ACK/NACK feedback can be transmitted in the same subframe when an 5G physical downlink shared channel (xPDSCH) is scheduled.

Accordingly, one aspect of the present technology provides for using a 3GPP 5G architecture and provides for an eNodeB to communicate with a user equipment (UE) using a self-contained time division duplex (TDD) subframe within a wireless communication network. The eNodeB can process, for transmission to the UE, a DL self-contained time division duplex (TDD) subframe comprising an extended physical downlink shared channel (xPDSCH) (e.g., a 3GPP LTE 5G xPDSCH), an extended physical downlink control channel (xPDCCH) (e.g., a 3GPP LTE 5G xPDCCH), a downlink (DL) spacing signal (which may or may not be included in the subframe), and a guard time, wherein the xPDSCH, the xPDCCH, the DL spacing signal, and the guard time are located within the DL self-contained TDD subframe prior to an 5G physical uplink control channel (xPUCCH). In an embodiment, the eNodeB can process an uplink (UL) self-contained TDD subframe, received from the UE, having a UL spacing signal located before or after an 5G physical uplink shared channel (xPUSCH).

In one aspect, the present technology provides for a user equipment (UE) operable to communicate with an eNodeB using a self-contained time division duplex (TDD) subframe within a wireless communication network. The UE can process a DL self-contained time division duplex (TDD) subframe, received from the eNodeB, comprising an extended physical downlink shared channel (xPDSCH) (e.g., a 3GPP LTE 5G xPDSCH), an extended physical downlink control channel (xPDCCH) (e.g., a 3GPP LTE 5G xPDCCH), a downlink (DL) spacing signal (if necessary), and a guard time, wherein the xPDSCH, the xPDCCH, the DL spacing signal, and the guard time are located within the DL self-contained TDD subframe prior to an 5G physical uplink control channel (xPUCCH). The UE can process, for transmission to the eNodeB, an uplink (UL) self-contained TDD subframe, comprising an 5G physical uplink shared channel (xPUSCH) having an UL spacing signal located before or after an extended physical uplink shared channel (xPUSCH) (e.g., the 3GPP LTE 5G xPUSCH). In one aspect, the UL spacing signal and/or DL spacing signal can be an additional signal that can be inserted within the subframe to relax (e.g., delay) a processing time for decoding. In one aspect, the UL spacing signals and/or DL spacing signal can be, for example, a sounding reference signal or a broadcast signal.

In one aspect, the present technology provides for an eNodeB to communicate with a user equipment (UE) using a self-contained time division duplex (TDD) subframe within a wireless communication network. The eNodeB can process, for transmission to the UE, a DL self-contained time division duplex (TDD) subframe comprising an extended physical downlink shared channel (xPDSCH) (e.g., a 3GPP LTE 5G xPDSCH), an extended physical downlink control channel (xPDCCH) (e.g., a 3GPP LTE 5G xPDCCH), a downlink (DL) spacing signal (which may or may not be included), and a guard time, wherein the xPDSCH, the xPDCCH, the DL spacing signal, and the guard time are located within the DL self-contained TDD subframe prior to an extended physical uplink control channel (xPUCCH) (e.g., a 3GPP LTE 5G xPUCCH). The eNodeB can process, an uplink (UL) self-contained TDD subframe, received from the UE, having a UL spacing signal located after an extended physical uplink shared channel (xPUSCH) (e.g., a 3GPP LTE 5G xPUSCH). The eNodeB can schedule DL data transmission and UL data transmission using aggregated self-contained TDD subframes upon data transmission traffic exceeding a defined threshold. The eNodeB can process, for transmission to the UE, an indication for using the aggregated self-contained TDD subframes.

FIG. 1 illustrates a mobile communication network within a cell 100 having an evolved node B (eNB or eNodeB) with a mobile device. FIG. 1 illustrates an eNB 104 that can be associated with an anchor cell, macro cell or primary cell. Also, the cell 100 can include a mobile device, such as, for example, a User Equipment (UE or UEs) 108 that can be in communication with the eNB 104. The eNB 104 can be a station that communicates with the UE 108 and can also be referred to as a base station, a node B, an access point, and the like. In one example, the eNB 104 can be a high transmission power eNB, such as a macro eNB, for coverage and connectivity. The eNB 104 can be responsible for mobility and can also be responsible for radio resource control (RRC) signaling. The UE or UEs 108 can be supported by the macro eNB 104. The eNB 104 can provide communication coverage for a particular geographic area. In 3GPP, the term "cell" can refer to a particular geographic coverage area of eNB and/or an eNB subsystem serving the coverage area with an associated carrier frequency and a frequency bandwidth, depending on the context in which the term is used.

Figure 2:
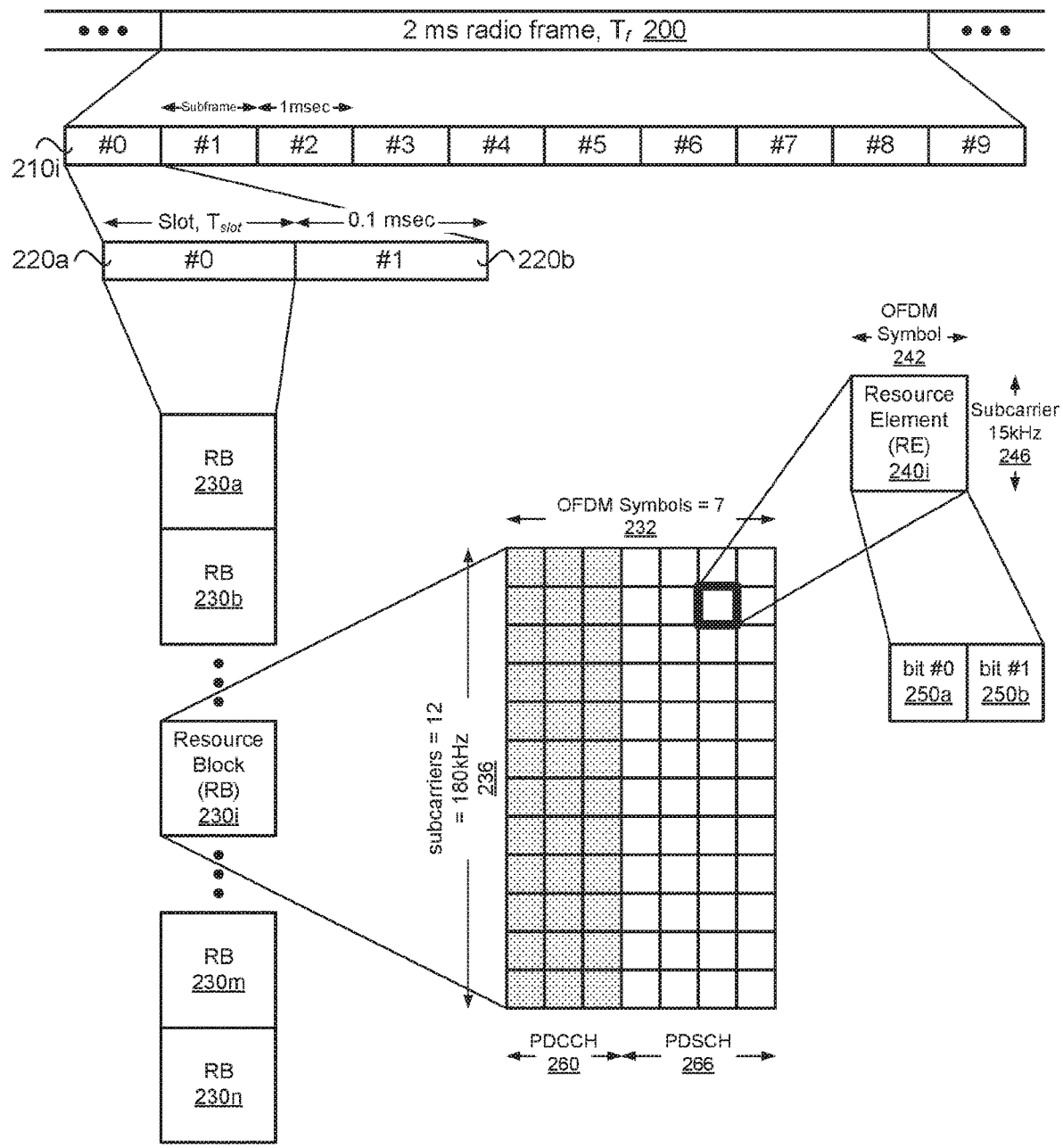
FIG. 2 illustrates a diagram of radio frame resources (e.g., a resource grid) for a downlink (DL) transmission including a physical downlink control channel (PDCCH) in accordance with an example.

FIG. 2 illustrates a diagram of radio frame resources (e.g., a resource grid) for a downlink (DL) transmission including a physical downlink control channel (PDCCH) in accordance with an example. In the example, a radio frame 200 of a signal used to transmit the data can be configured to have a duration, Tf, of 2 milliseconds (ms). Each radio frame can be segmented or divided into ten subframes 210i that are each 0.2 ms long. Each subframe can be further subdivided into two slots 220a and 220b, each with a duration, Tslot, of 0.1 ms. In one example, the first slot (#0) 220a can include a physical downlink control channel (PDCCH) 260 and/or a physical downlink shared channel (PDSCH) 266, and the second slot (#1) 220b can include data transmitted using the PDSCH.

Each slot for a component carrier (CC) used by the node and the wireless device can include multiple resource blocks (RBs) 230a, 230b, 230i, 230m, and 230n based on the CC frequency bandwidth. The CC can include a frequency bandwidth and a center frequency within the frequency bandwidth. In one example, a subframe of the CC can include downlink control information (DCI) found in the PDCCH. The PDCCH in the control region can include one to three columns of the first OFDM symbols in a subframe or physical RB (PRB), when a legacy PDCCH is used. The remaining 11 to 13 OFDM symbols (or 14 OFDM symbols, when legacy PDCCH is not used) in the subframe can be allocated to the PDSCH for data (for short or normal cyclic prefix). For example, as used herein, the term 'slot' may be used for 'subframe', or 'transmission time interval (TTI)' can be used for 'frame' or 'frame duration'. In addition, a frame may be considered a user transmission specific quantity (such as a TTI associated with a user and a data flow).

Each RB (physical RB or PRB) 230i can include 12 subcarriers 236 of 15 kHz subcarrier spacing, for a total of 180 kHz per RB (on the frequency axis) and 6 or 7 orthogonal frequency-division multiplexing (OFDM) symbols 232 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 240i using short or normal cyclic prefixing, or the resource block can be mapped to 72 REs (not shown) using extended cyclic prefixing. The RE can be a unit of one OFDM symbol 242 by one subcarrier (i.e., 15 kHz) 246.

In the example of FIG. 2, each RE can transmit two bits 250a and 250b of information in the case of quadrature phase-shift keying (QPSK) modulation. Other types of modulation can be used, such as 16 quadrature amplitude modulation (QAM) or 64 QAM, to transmit 4 bits of information per RE, to transmit 6 bits of information in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Turning now to FIG. 3, an enhanced downlink (DL) self-contained time division duplex (TDD) subframe 300 is depicted. That is, FIG. 3 illustrates a self-contained TDD subframe structure in the DL. In particular, the xPDSCH can be scheduled by an extended physical downlink control channel (xPDCCH) and can be transmitted immediately after the xPDCCH. Following the decoding of the xPDSCH, one or more UEs can feedback the ACK/HACK in an extended physical uplink control channel (xPUCCH) in a selected section of the subframe, such as in the last section (or part) of the subframe. In one aspect, a guard time (GT) can be inserted between the xPDSCH and the xPUCCH in order to accommodate the DL-to-UL and/or UL-to-DL switching time and round-trip propagation delay.

In one aspect, for a large cell size, e.g., 10 km cell radius, the round trip propagation delay can be significantly large, and thus the size of GT can also be large. Thus, in order to further reduce the GT overhead, two or more subframes can be aggregated for one xPDSCH transmission for one UE, as illustrated in FIG. 4.

FIG. 4 depicts a self-contained time division duplex (TDD) subframe aggregation 400 in the downlink (DL). In FIG. 4, the xPDSCH can span two subframes, such as subframe #1 and subframe #2, and a GT can be inserted in the second subframe, such as in between the xPDSCH and the xPUCCH. In this case, GT overhead can be reduced by half compared to the TDD subframe structure as shown in FIG. 3.

In the event two self-contained TDD subframes with different aggregation levels coexist within one system bandwidth, an eNB may not be able to transmit the xPDSCH and receive the xPUCCH simultaneously, due to a full duplex constraint, as illustrated in FIG. 5.

FIG. 5 illustrates 500 an example of potential system issues, such as eNB being able to transmit the xPDSCH and receive the xPUCCH simultaneously, for self-contained time division duplex (TDD) subframes with different aggregation levels. In one aspect, the eNB can schedule the xPDSCH transmission for UE #1 in a 1st subframe. The eNB can schedule the xPDSCH transmission for UE #3 in both the 1st subframe and a 2nd subframe with an aggregated TDD subframe structure. However, in this case, UE #1 may not be able to transmit (Tx) the HARQ ACK/NACK in the 1st subframe given that eNB may not be able to transmit (Tx) and receive (Rx) at the same time.

To address this issue, an enhanced HARQ-ACK feedback mechanism can be provided. In one aspect, the present technology provides for a self-contained TDD subframe structure, with 1) an enhanced self-contained TDD subframe structure, 2) a mechanism to trigger the aggregated TDD subframe, and/or 3) mechanisms to achieve coexistence between self-contained TDD subframes with different aggregation levels within same system bandwidth.

As mentioned above, in a self-contained TDD subframe, the guard time (GT) can accommodate the DL-to-UL and UL-to-DL switching time and maximum round-trip propagation time. This indicates that the dimension of GT can cover the largest cell size in the deployed scenario. To reduce the GT overhead and provide more processing time for decoding at the receiver (e.g., at the UE), an additional signal may be inserted after the data transmission.

Figure 6:
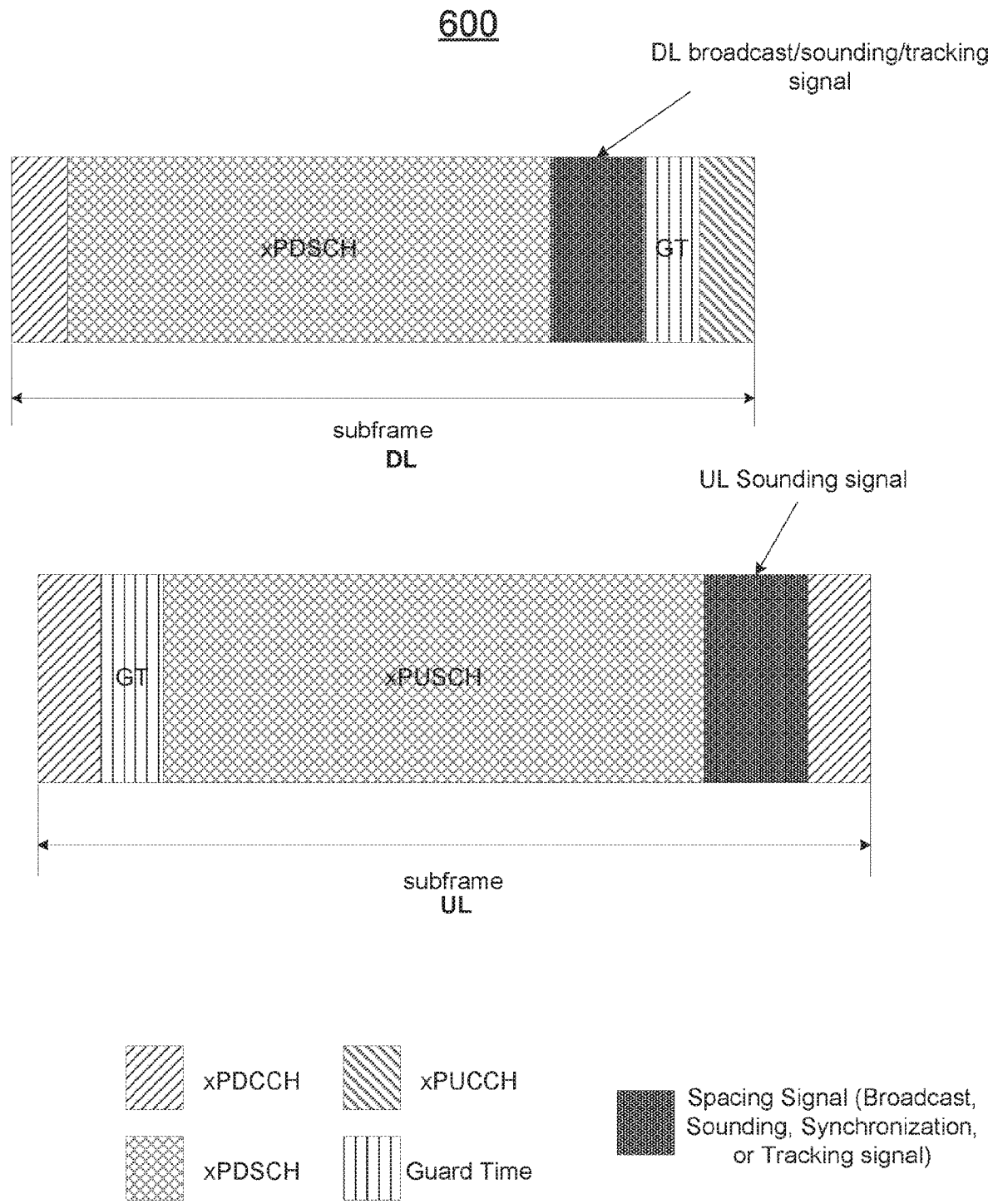
FIG. 6 illustrates enhancements to both a downlink (DL) self-contained time division duplex (TDD) subframe and an uplink (UL) self-contained time division duplex (TDD) subframe in accordance with an example.

FIG. 6 illustrates enhancements 600 to both a downlink (DL) self-contained time division duplex (TDD) subframe (e.g., an extended DL self-contained TDD subframe) and an uplink (UL) self-contained time division duplex (TDD) subframe (e.g. an extended UL self-contained TDD subframe).

In one aspect, in the DL, a spacing signal can be inserted after the xPDSCH transmission. That is, in one aspect, an extended self-contained TDD subframe can include a first part including the xPDCCH, the xPDSCH in a second part, the spacing signal in a third part, the guard time (GT) in a fourth part, and xPUCCH in a final or fifth part. In one aspect, the spacing signal can be a broadcast signal, a sounding reference signal (SRS), another type of reference signal (e.g., channel state information reference signal (CSI-RS)), a tracking signal (e.g., beamforming tracking or a time/frequency tracking signal), and/or a DL synchronization signal or synchronization channel (e.g., primary synchronization signal and/or secondary synchronization signal and/or beamforming reference signal). The placement of the spacing signal in the DL self-contained TDD subframe, after the shared channel but prior to the uplink channel, can provide more processing time at the UE to decode the xPDSCH and then determine what, if any data is to be sent in a HARQ ACK/NACK in the xPUCCH. The shared channel can be added to the DL self-contained TDD subframe to provide the additional processing time at the UE without sacrificing the spectrum efficiency. It should be noted that the spacing and timing of the spacing signal can be cell specific or UE specific.

Similarly, in the UL, a UL spacing signal can be inserted after the extended physical uplink shared channel (xPUSCH) transmission. That is, in one aspect, the UL self-contained TDD subframe may have a first part including the xPDCCH, the guard time (GT) in a second part, the xPUSCH in a third part, an UL spacing signal in a fourth part, and the xPUCCH or xPDCCH in a fifth or final part. In one aspect, the UL spacing signal can be a broadcast signal, sounding reference signal (SRS), tracking signal, and/or UL synchronization signal. It should be noted that although in FIG. 6 the xPDCCH is illustrated in the last part/section of subframe for the UL self-contained TDD subframe, xPUCCH can be transmitted in the last part of the subframe and the xPDCCH can be used to carry the UL HARQ ACK/NACK, and/or the UL HARQ ACK/NACK can be transmitted at a beginning of a first part of a next subframe. Alternatively, another dedicated signal, e.g., an extended physical HARQ indicator channel (PHICH) can be used to carry the UL HARQ ACK/NACK either in the last part or section of one subframe or the beginning of the next subframe.

Figure 7:
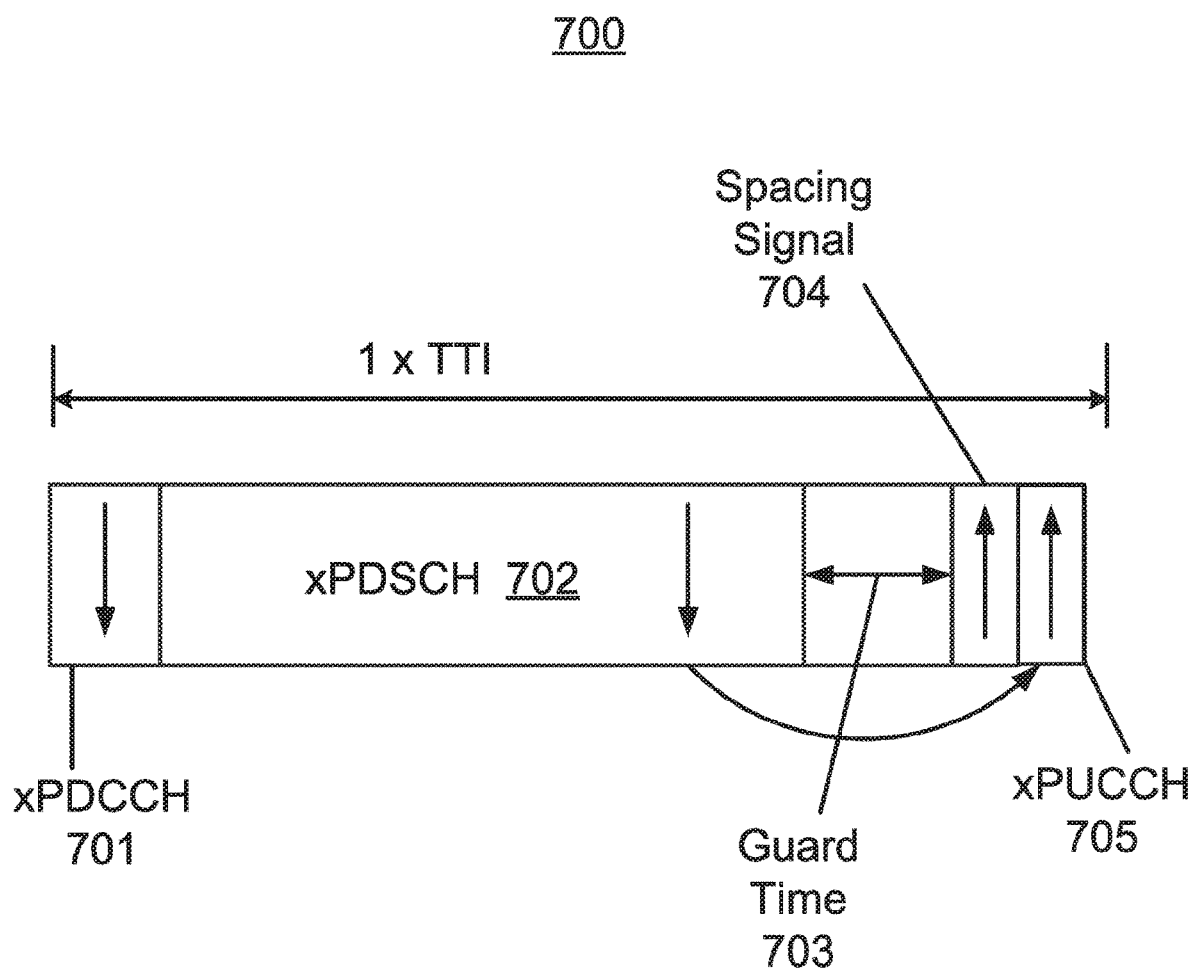
FIG. 7 illustrates a first example of an enhanced self-contained time division duplex (TDD) subframe in accordance with an example.

FIG. 7 illustrates a first example 700 of an enhanced self-contained time division duplex (TDD) subframe 700. In one aspect, as illustrated in FIG. 7, a self-contained TDD subframe can include one or more fields. That is, the self-contained TDD subframe can have at least five fields. The field 701 can be placed first in the self-contained TDD subframe that is used for DL control channel transmission, such as the xPDCCH. The second field 702 can be reserved for downlink data transmission, such as the xPDSCH, and a fifth field 705 of subframe 700 can be reserved for UL transmission, such as the xPUCCH, so as to carry HARQ-ACK bits associated with the xPDSCH transmitted in the second field 702. In addition, a guard time (GT) (e.g., a guard period) can be reserved in a third field 703 and can be configured by higher layers with a variable length. The duration of the GT can be based on a number of parameters, which may include the maximum round trip propagation time in a cell depending on cell size. In one aspect, to avoid efficiency loss, a spacing signal (e.g., a sounding reference signal or other type of signal, as discussed with respect to FIG. 6) can be transmitted in a fourth field 704. Also, UL data can be transmitted in the field 704 scheduled by the xPDCCH channel 701 in the event the duration of field 702 is too small for the spacing signal (e.g., a SRS) and is not configured.

Figure 8:
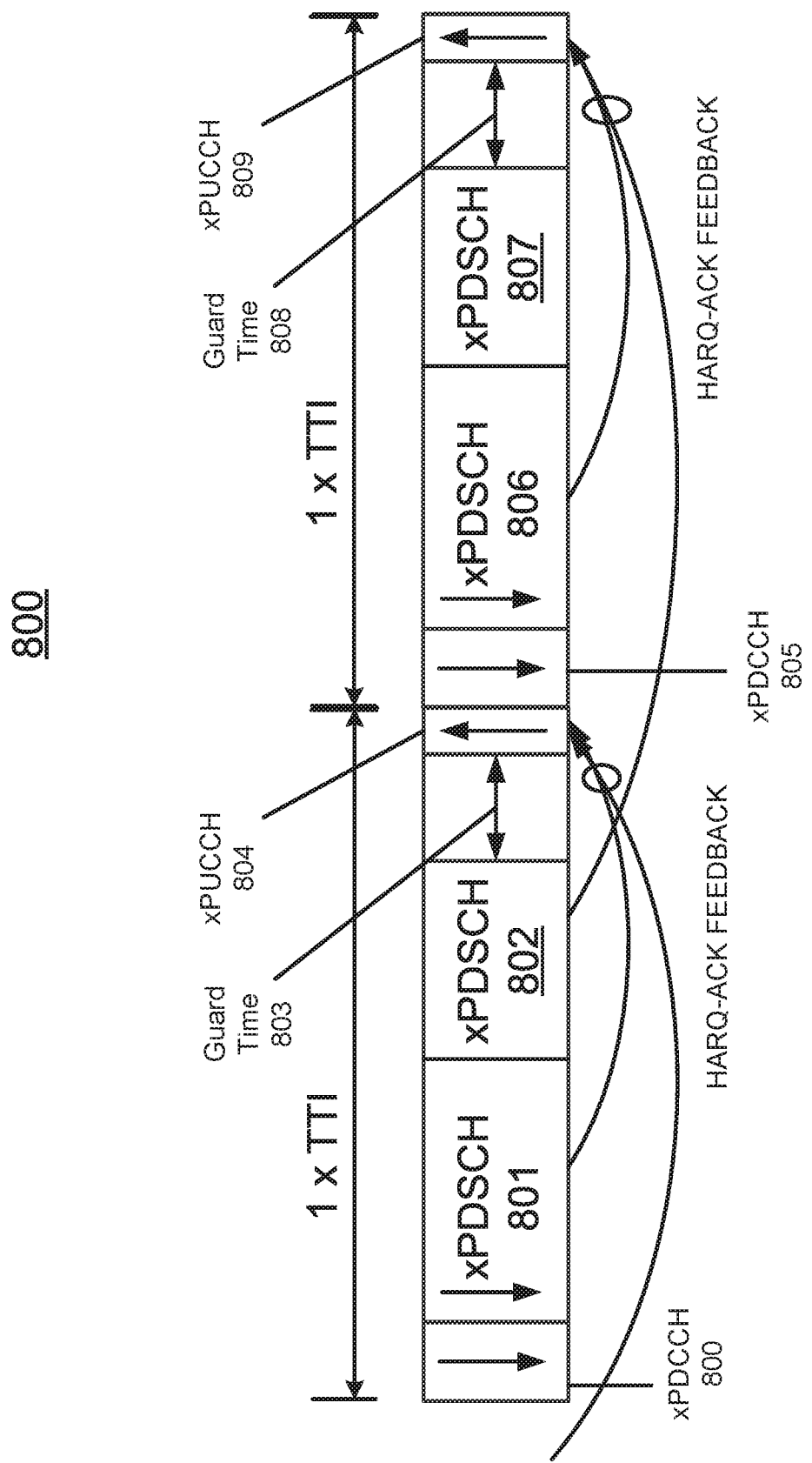
FIG. 8 illustrates a second example of an enhanced self-contained time division duplex (TDD) subframe with feedback in accordance with an example.

FIG. 8 illustrates an example 800 of an enhanced self-contained time division duplex (TDD) subframe with feedback. That is, FIG. 8 illustrates a self-contained TDD subframe that can include five fields with field 800 used for the xPDCCH. Field 801 can be used for a first xPDSCH, field 802 can be used for a second xPDSCH, field 803 can be used for the guard time (GT), and field 804 can be used for the xPUCCH for a first HARQ-ACK feedback. Fields 800-804 can be used in a first transmission time interval (1×TTI). The field 805 can be used for the xPDCCH, field 806 can be used for a first xPDSCH and field 807 can be used for a second xPDSCH, field 808 can be used for the guard time (GT), and field 809 can be used for the xPUCCH. Fields 805-809 can be used in a second transmission time interval (1×TTI). The length of the TTI can be determined based on system specifications. The TTI length may be fixed, or may vary.

To further improve the resource efficiency, an additional DL can be introduced within the xPDSCH 802 for additional DL data transmission. In one aspect, there can be several differences between xPDSCH 801 and xPDSCH 802. The differences between xPDSCH 801 and xPDSCH 802 can include the following. 1) Different channel coding and modulation schemes can be applied for two xPDSCHs, such as xPDSCH 801 and xPDSCH 802, in a same transmission time interval (TTI), such as taking into account different processing time for HARQ-ACK feedback (e.g. a higher modulation scheme and/or advanced channel coding scheme such as turbo or tail-biting convolution code (TBCC) encoder can be considered for the latter field 802 compared to field 801). 2) Separate cyclic redundancy check (CRC) attachments can be conducted for Transmission Blocks (TBs) on xPDSCH 801 and xPDSCH 802 to allow independent decoding and corresponding HARQ-ACK information feedback. The CRC length of two TBs can be different. 3) Accordingly, HARQ-ACK for xPDSCH 801 can be transmitted on field 804 on the xPUCCH channel.

In contrast, the HARQ-ACK associated with xPDSCH 802 can be transmitted on xPUCCH 807 in a next TTI due to a processing time limitation. The splitting between field 801 and 802 can be fixed in a design specification, configured by higher layers, and/or dynamically indicated by a downlink control information (DCI) format or a combination. It should be noted that the length of field 802 can be variable depending on the length of the GT (e.g., the guard period), e.g. 0 or 1 or 2 or 3 symbols.

Figure 9:
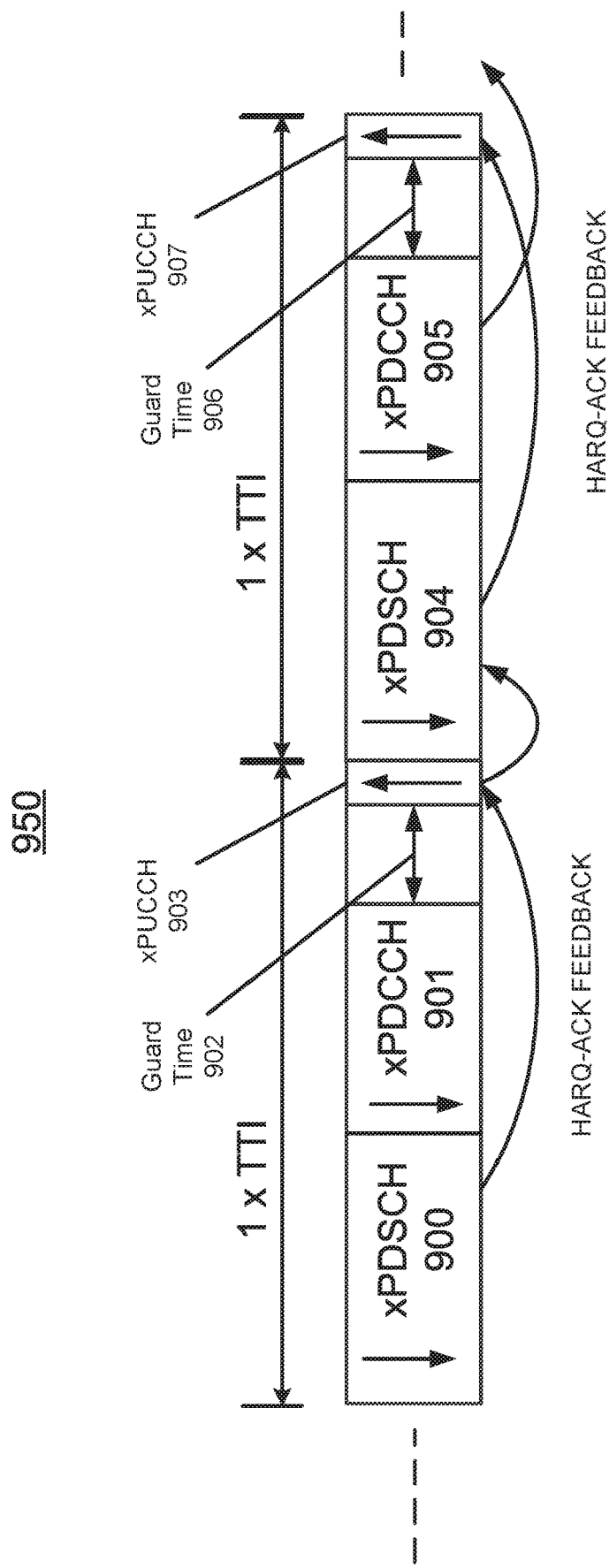
FIG. 9 illustrates a third example of an enhanced self-contained time division duplex (TDD) subframe with feedback in accordance with an example.

Turning now to FIG. 9, a third example 900 of an enhanced self-contained time division duplex (TDD) subframe and providing feedback is illustrated. In one aspect, a self-contained TDD subframe can include four fields including xPDSCH 900, xPDCCH 901, GT 902, and/or xPUCCH 903. Particularly, HARQ-ACK feedback (e.g., HARQ-ACK bits) for xPDSCH 900 can be carried on xPUCCH 703 in a same subframe (e.g., during a first TTI "1×TTI"). More specifically, xPDCCH 901 can be inserted between xPDSCH 900 and its xPUCCH channel 902, which can carry the HARQ-ACK feedback, to schedule the DL data transmission on xPDSCH 904 of the next subframe. FIG. 9 also depicts the next or subsequent subframe for a second TTI, with four fields including xPDSCH 904, xPDCCH 905, GT 906, and/or xPUCCH 907. It should be noted that in FIG. 7, for example, the xPDDCH can be used to schedule the xPDSCH in the same subframe and in FIG. 9, the xPDCCH can be used to schedule the xPDSCH in a next subframe.

In one aspect, the present technology provides for triggering and/or indicating when to use an aggregated self-contained TDD subframe. In one aspect, depending on the traffic condition, an eNB can schedule the DL or UL data transmission within aggregated self-contained TDD subframes. In one aspect, one or more options can be considered and employed to trigger the aggregated TDD subframes. For example, in one aspect, the number of subframes used for the xPDSCH and/or the xPUSCH transmission within aggregated TDD subframes can be indicated in a DCI format for DL assignment and UL grant. In one example, the number of subframes used can be explicitly signaled in the DCI format.

In one aspect, an eNB can indicate a number of subframes from a subset of configured aggregated self-contained TDD subframes, wherein the subset can be predefined and/or configured by higher layers via an extended master information block (xMIB) (e.g., a 3GPP LTE 5G xMIB), an extended system information block (xSIB) (e.g., a 3GPP LTE 5G xSIB), and/or UE specific dedicated RRC signaling. In one example, the aggregation level for the aggregated TDD subframes can be {1, 2, 4, 8} subframes, which can be configured by the xSIB. A 2-bit field in the DCI format for DL assignment and UL grant can be used to signal the number of subframes from this subset for the xPDSCH and/or the xPUSCH transmission.

In another aspect, the number of subframes used for xPDSCH or xPUSCH transmission within aggregated TDD subframes can be indicated via xMIB, xSIB and/or UE dedicated RRC signalling, which it should be noted this can also depend on UE specific capability, i.e., whether a UE can support the aggregated TDD subframe structure. In another aspect, the number of subframes used for xPDSCH or xPUSCH transmission can be signaled via a dedicated signal or channel in the DL. In another aspect, a legacy Physical Control Format Indicator Channel (PCFICH), as defined in the 3GPP LTE Rel. 8 or 9 specifications, can be reused to indicate the number of subframes. It should be noted that in this option, 2 bit information can be carried by PCFICH. For instance, this 2-bit information may indicate that the number of subframes is 1, 2, 4 or 8. In another aspect, physical TDD configuration indicator channel (PTCICH) may be applied to indicate the number of aggregated subframes. In an additional aspect, the number of subframes used for the xPDSCH and/or the xPUSCH transmission can be indicated by a combination of the aforementioned mechanisms.

In one example, the set of aggregated levels for the aggregated TDD subframe can be predefined, such as 2, 4, 8, and/or 16 subframes and the PCFICH can be used to indicate one of the aggregation levels in the set. It should be noted that cross-subframe scheduling can be used for aggregated TDD subframes. In particular, a gap between the xPDCCH and the xPDSCH and/or the xPUSCH can be explicitly indicated in the DCI format for DL assignment or UL grant. Alternatively, depending on the UE capability, a gap can be provided by higher layer via UE specific dedicated RRC signalling.

Figure 10:
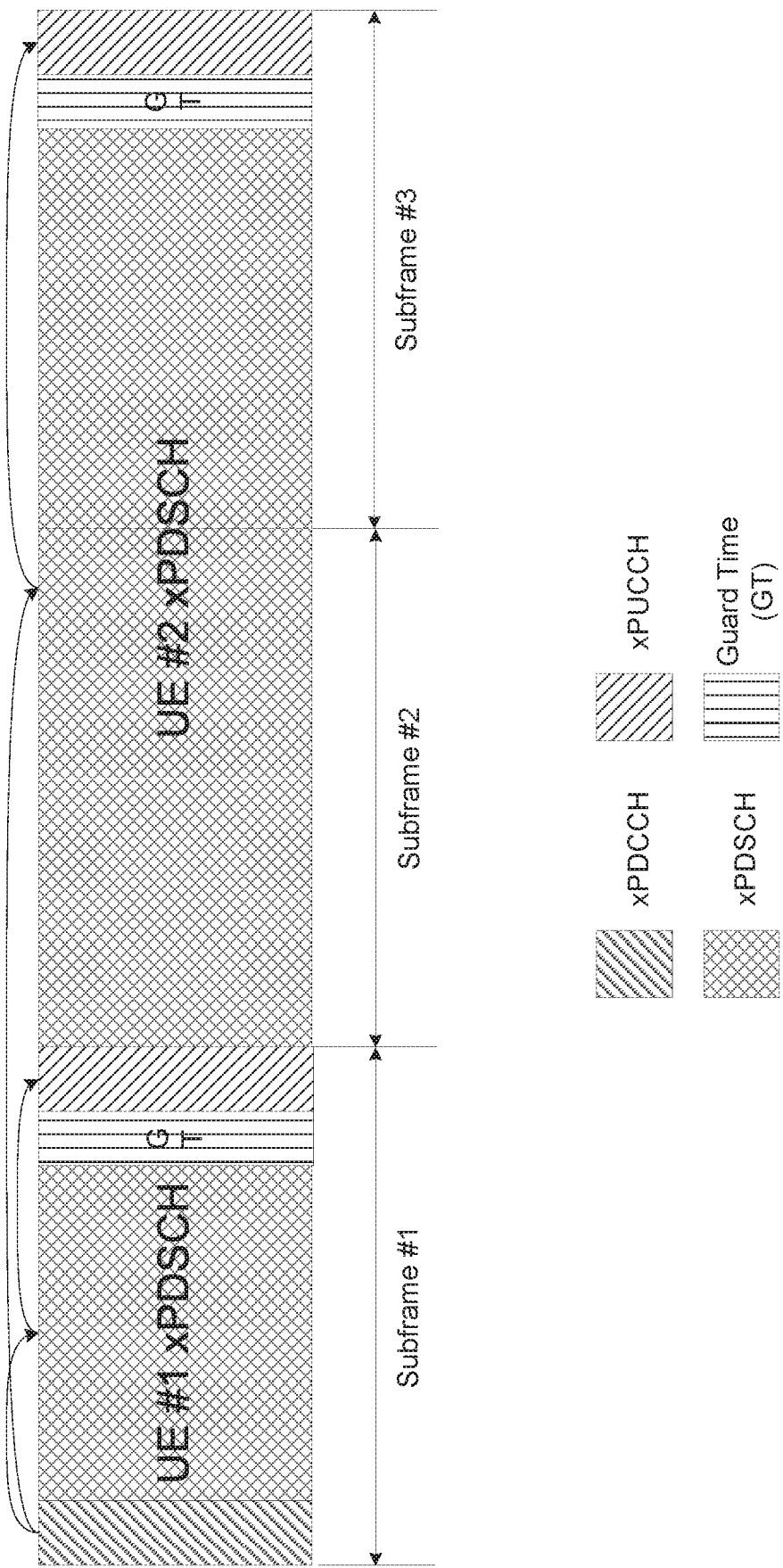
FIG. 10 illustrates cross-subframe scheduling for aggregated self-contained time division duplex (TDD) subframes in accordance with an example.

Turning now to FIG. 10, a system 1000 of cross-subframe scheduling for aggregated self-contained time division duplex (TDD) subframes is depicted. That is, FIG. 10 illustrates one example of cross-subframe scheduling for aggregated TDD subframes. In this example, for UE #1, the xPDCCH and associated xPDCCH can be transmitted in the same subframe #1, while for UE #2, cross subframe scheduling can be applied (e.g., scheduling xPDSCH using both subframe #2 and subframe #3), where a gap between xPDCCH and associated xPDSCH can be 1 subframe. It should be noted that in this example, the aggregation levels for UE #1 and #2 can be 1 and 2 subframes, respectively. A guard time (GT) (e.g., a guard period) can also be used in between the xPDSCH and the xPUCCH.

Similarly, cross-carrier scheduling can be used for aggregated self-contained TDD subframes. In particular, a component carrier (CC) index used for the data transmission can be explicitly indicated in the DCI format for DL assignment or UL grant. Accordingly, the present technology provides for achieving coexistence between self-contained TDD subframes with different aggregation levels within same system bandwidth. In one aspect, an eNB may not be able to transmit the xPDSCH and receive the xPUCCH simultaneously in the case where two or more xPDSCH or xPUSCH transmissions with different aggregation levels are scheduled within the same system bandwidth. To address this issue, several options can be considered.

In one aspect, aggregated HARQ ACK/NACK mechanisms can be employed for multiple UEs, which are scheduled within the same aggregated TDD subframe window. That is, multiple UEs can transmit the HARQ ACK/NACK in the same subframe. In particular, multiple UEs can feedback the HARQ ACK/NACK via the xPUCCH in a last subframe of the aggregated TDD subframe window. To enable providing the HARQ ACK/NACK feedback via the xPUCCH in a last subframe of the aggregated TDD subframe window, a gap between the xPDSCH and/or the xPUSCH transmission and HARQ ACK/NACK feedback can be explicitly indicated in the DCI format for DL assignment or UL grant.

Figure 11:
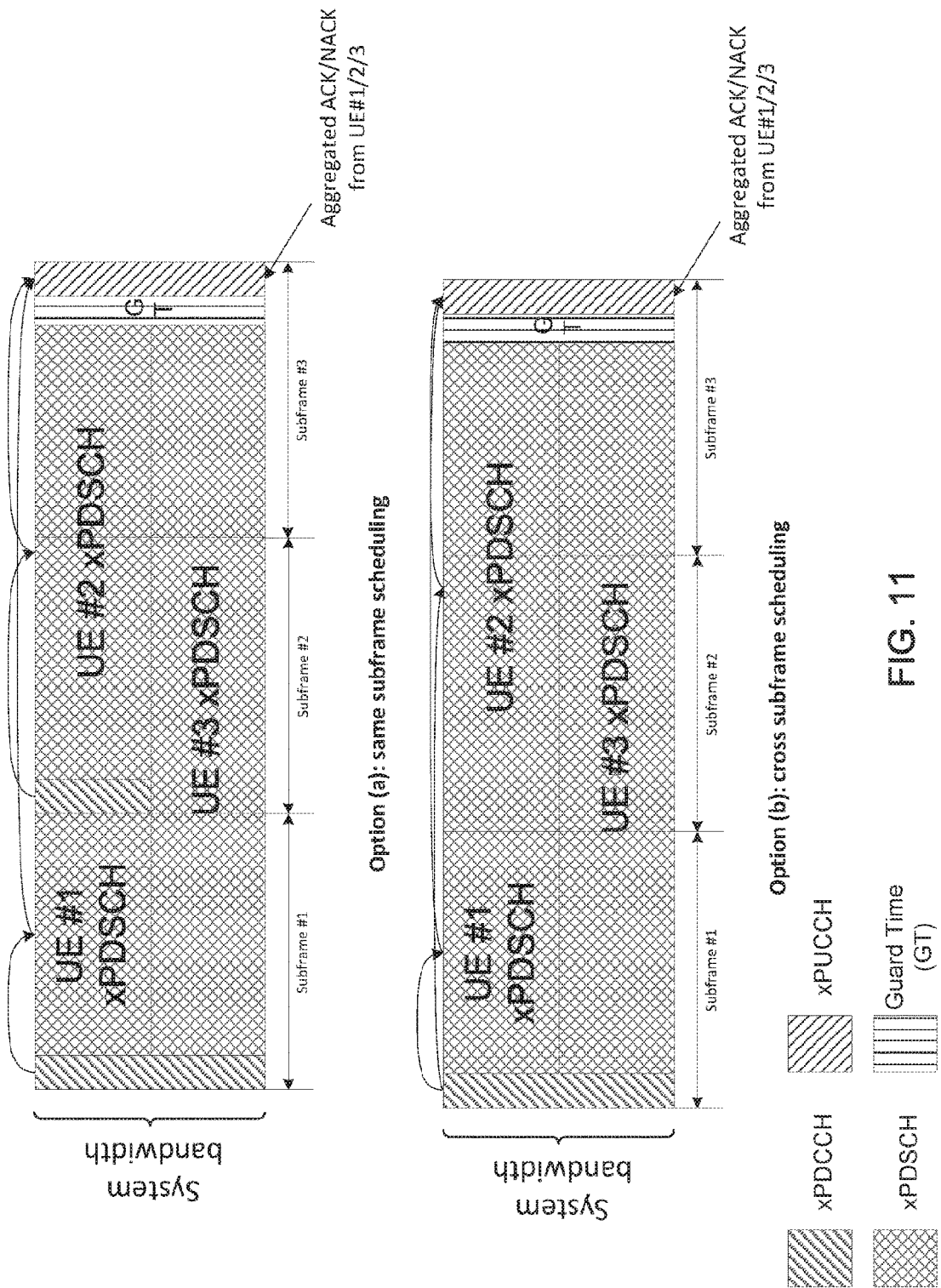
FIG. 11 illustrates aggregated ACK/NACK feedback for same and cross-subframe scheduling for aggregated self-contained time division duplex (TDD) subframes in accordance with an example.

Turning now to FIG. 11, aggregated ACK/NACK feedback for same and cross-subframe scheduling for aggregated self-contained time division duplex (TDD) subframes is depicted. That is, FIG. 11 illustrates examples 1100 of aggregated ACK/NACK feedback for same and cross-subframe scheduling, respectively. As depicted in FIG. 11, in Option (a): similar and/or same subframe scheduling for the xPDSCH transmissions can be applied for all UEs. Subsequently, all UEs feedback the HARQ ACK/NACK in the same subframe. That is, all UEs feedback the HARQ ACK/NACK in subframe #3 as shown in FIG. 11.

As depicted in Option (b) of FIG. 11: similar and/or same subframe scheduling can be applied for UE #1 and UE #3, while cross-subframe scheduling can be applied for UE #2. Similar to the Option (a), all UEs can feedback the HARQ ACK/NACK in the subframe #3. To avoid the resource collision for aggregated HARQ ACK/NACK from multiple UEs, a resource index for the ACK/NACK feedback on the xPUCCH can be defined as a UE specific parameter, which can be signaled via UE specific RRC signalling.

Alternatively, the resource index for the ACK/NACK feedback on the xPUCCH can be determined as a function of subframe index within a maximum aggregation level (which can be specified according to eNB scheduling) and other parameters, such as a demodulation reference signal (DMRS) sequence index for the associated xPDSCH and/or xPUSCH transmission. In one aspect, cross-carrier ACK/NACK feedback can be enabled to allow coexistence of aggregated self-contained TDD subframes with different aggregation levels, which reduces the latency for HARQ ACK/NACK feedback. In one aspect, the CC index for ACK/NACK feedback transmission can be explicitly indicated in the DCI format for DL assignment or UL grant. Alternatively, the CC index for ACK/NACK feedback transmission can be signaled via UE specific RRC signalling. In one example, UE can feedback the ACK/NACK on a primary cell (PCell).

Figure 12:
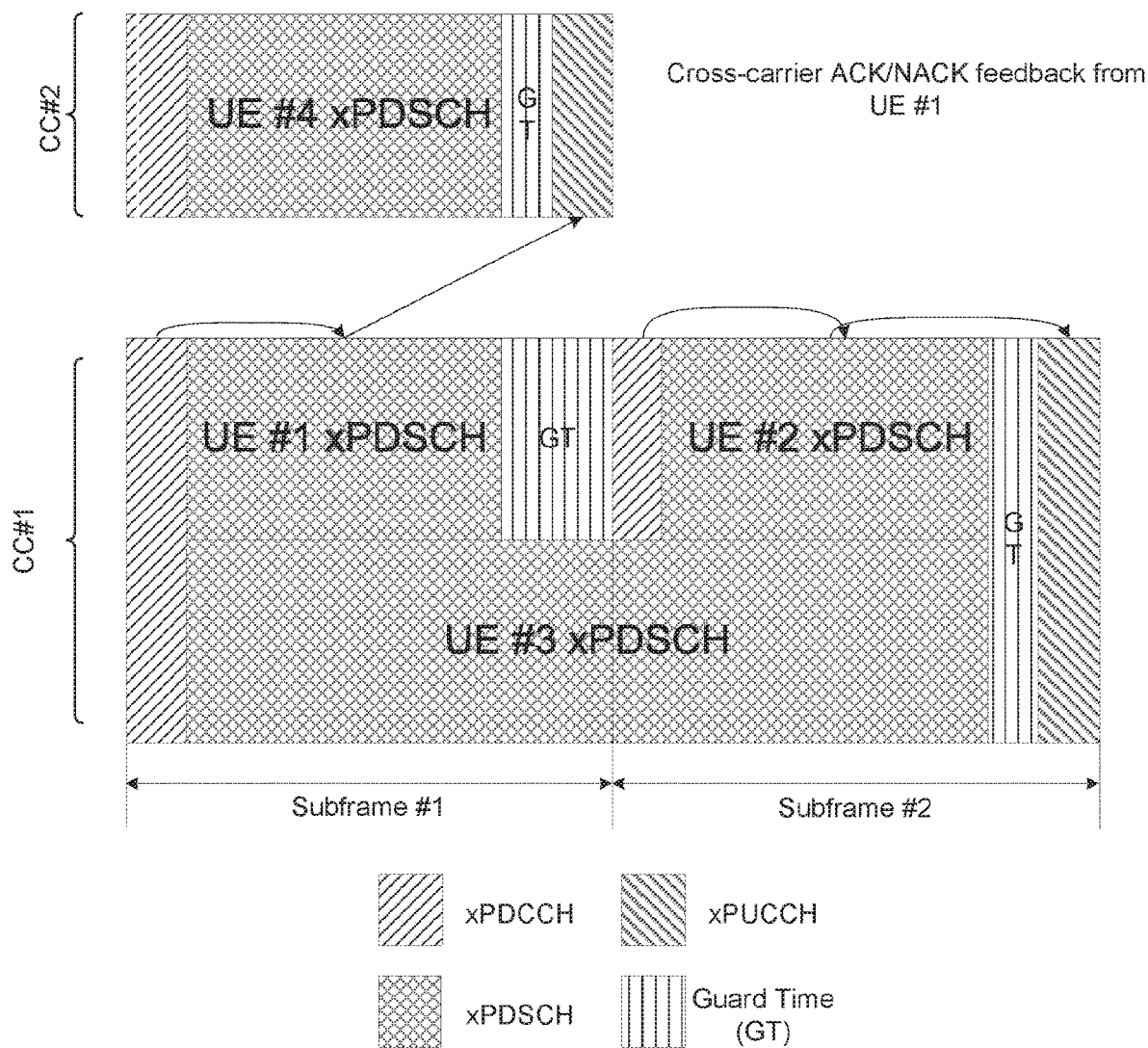
FIG. 12 illustrates cross-carrier ACK/NACK feedback and self-subframe scheduling for aggregated self-contained time division duplex (TDD) subframes in accordance with an example.

FIG. 12 illustrates cross-carrier ACK/NACK feedback and self-subframe scheduling for aggregated self-contained time division duplex (TDD) subframes 1200. That is, FIG. 12 illustrates one example of cross-carrier ACK/NACK feedback. In this example, to avoid the simultaneous transmission and reception, an eNB can schedule UE #1 to provide ACK/NACK feedback in component carrier (CC) #2, such as within xPUCCH of CC #2. In CC #1, UE #2 and #3 can feedback the aggregated ACK/NACK in the same subframe, such as within xPUCCH of subframe #2.

Figure 13:
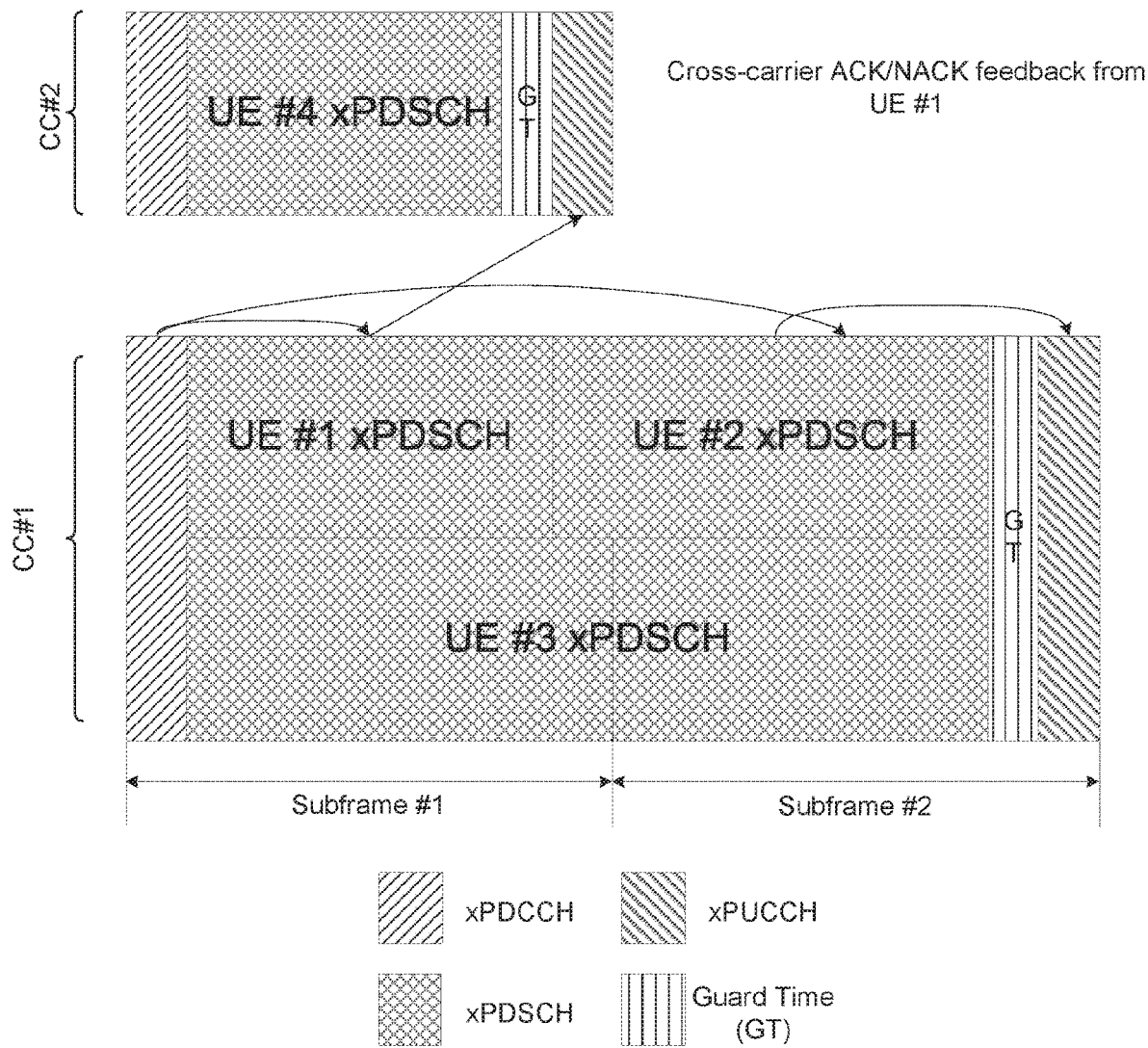
FIG. 13 illustrates cross-carrier ACK/NACK feedback and cross-subframe scheduling for aggregated self-contained time division duplex (TDD) subframes in accordance with an example.

As a further example to reduce the GT (e.g., a guard period) overhead, cross subframe scheduling can be applied as shown in the FIG. 13. FIG. 13 illustrates cross-carrier ACK/NACK feedback and cross-subframe scheduling for aggregated self-contained time division duplex (TDD) subframes 1300 in accordance with an example. In this example, cross-subframe scheduling can be applied for UE #2 and the starting position of xPDSCH transmission for UE #2 can be right after the xPDSCH transmission for UE #1. In this case, the GT in the CC#, as shown above in FIG. 12, can be avoided, thereby improving the spectrum efficiency. Similar to the aggregated ACK/NACK feedback mechanism, to avoid the resource collision for aggregated HARQ ACK/NACK from multiple UEs, a resource index for the ACK/NACK feedback on the xPUCCH can be defined as a UE specific parameter, which can be signaled via UE specific radio resources control (RRC) signalling. Alternatively, a resource index for the ACK/NACK feedback on the xPUCCH can be determined as a function of CC index for the data transmission and other parameters, such as the DMRS sequence index for the associated xPDSCH or xPUSCH transmission.

Turning now to FIG. 14, an example provides functionality 1400 of an eNodeB operable to communicate with a User Equipment (UE) using a self-contained time division duplex (TDD) subframe, as shown in the flow chart in FIG. 14. The functionality 1400 can be implemented as a method or the functionality can be executed as instructions on a machine, where the instructions are included one or more computer readable mediums or one or more non-transitory machine readable storage mediums. The eNodeB can comprise one or more processors and memory configured to: generate and/or process, for transmission to the UE, a DL self-contained time division duplex (TDD) subframe comprising an extended physical downlink shared channel (xPDSCH), an extended physical downlink control channel (xPDCCH), a downlink (DL) spacing signal, and a guard time, wherein the xPDSCH, the xPDCCH, the DL spacing signal, and the guard time are located within the DL self-contained TDD subframe prior to an extended physical uplink control channel (xPUCCH), as in block 1410. The eNodeB can comprise one or more processors and memory configured to: process, an uplink (UL) self-contained TDD subframe, received from the UE, having a UL spacing signal located after an extended physical uplink shared channel (xPUSCH), as in block 1420.

Another example provides functionality 1500 of a user equipment (UE) operable to communicate with an eNodeB using a self-contained time division duplex (TDD) subframe, as shown in the flow chart in FIG. 15. The functionality 1500 can be implemented as a method or the functionality can be executed as instructions on a machine, where the instructions are included one or more computer readable mediums or one or more non-transitory machine readable storage mediums. The UE can comprise one or more processors and memory configured to: process a DL self-contained time division duplex (TDD) subframe, received from the eNodeB, comprising an extended physical downlink shared channel (xPDSCH), an extended physical downlink control channel (xPDCCH), a downlink (DL) spacing signal, and a guard time, wherein the xPDSCH, the xPD-CCH, the DL spacing signal, and the guard time are located within the DL self-contained TDD subframe prior to an extended physical uplink control channel (xPUCCH), as in block 1510. The UE can comprise one or more processors and memory configured to: generate and/or process, for transmission to the eNodeB, an uplink (UL) self-contained TDD subframe an extended physical uplink shared channel (xPUSCH) having an UL spacing signal located after an extended physical uplink shared channel (xPUSCH), as in block 1520.

Another example provides functionality 1600 of an eNodeB operable to communicate with a User Equipment (UE) using a self-contained time division duplex (TDD) subframe, as shown in the flow chart in FIG. 16. The functionality 1600 can be implemented as a method or the functionality can be executed as instructions on a machine, where the instructions are included one or more computer readable mediums or one or more non-transitory machine readable storage mediums. The eNodeB can comprise one or more processors and memory configured to: generate and/or process, for transmission to the UE, a DL self-contained time division duplex (TDD) subframe comprising an extended physical downlink shared channel (xPDSCH), an extended physical downlink control channel (xPDCCH), a downlink (DL) spacing signal, and a guard time (e.g., guard period), wherein the xPDSCH, the xPDCCH, the DL spacing signal, and the guard time are located within the DL self-contained TDD subframe prior to an extended physical uplink control channel (xPUCCH), as in block 1610. The eNodeB can comprise one or more processors and memory configured to: process, an uplink (UL) self-contained TDD subframe, received from the UE, having a UL spacing signal located after an extended physical uplink shared channel (xPUSCH), as in block 1620. The eNodeB can comprise one or more processors and memory configured to: schedule DL data transmission and UL data transmission using aggregated self-contained TDD subframes upon data transmission traffic exceeding a defined threshold, as in block 1630. The eNodeB can comprise one or more processors and memory configured to: process, for transmission to the UE, an indication for using the aggregated self-contained TDD subframes, as in block 1640.

Figure 17:
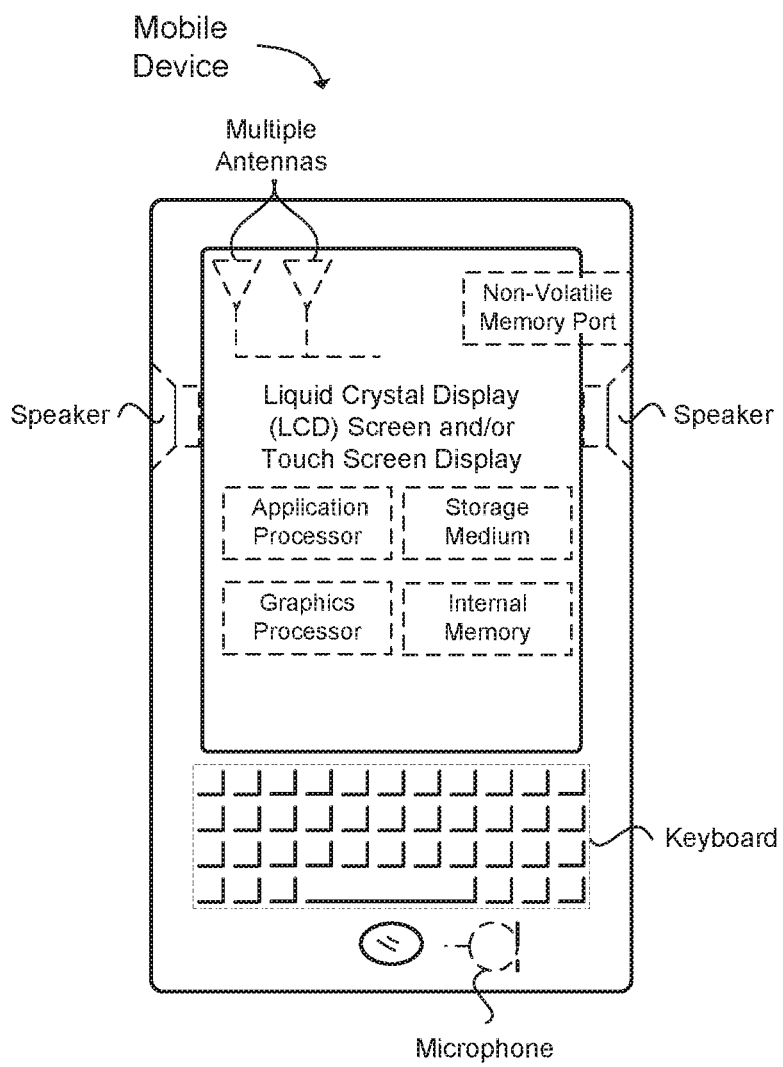
FIG. 17 illustrates a diagram of example components of a wireless device (e.g. User Equipment "UE") device in accordance with an example.

FIG. 17 illustrates a diagram of a wireless device (e.g., UE) in accordance with an example. FIG. 17 provides an example illustration of the wireless device, such as a user equipment (UE) UE, a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communicate with the application processor, the graphics processor, the display, the non-volatile memory port, and/or internal memory. In one aspect, the application processor and graphics processor are storage mediums.

Figure 18:
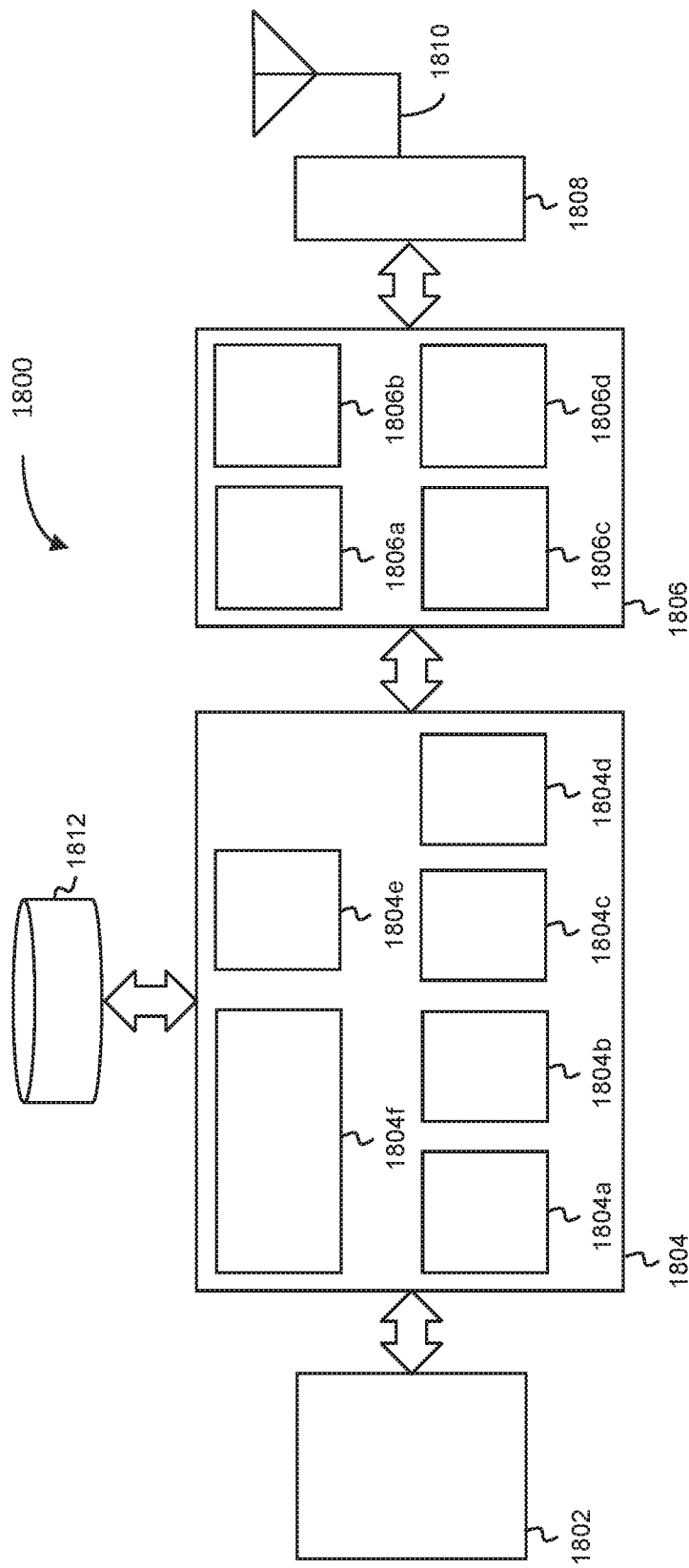
FIG. 18 illustrates a diagram of example components of a User Equipment (UE) device in accordance with an example.

FIG. 18 illustrates a diagram of example components of a User Equipment (UE) device in accordance with an example. FIG. 18 illustrates, for one aspect, example components of a User Equipment (UE) device 1800. In some aspects, the UE device 1800 can include application circuitry 1802, baseband circuitry 1804, Radio Frequency (RF) circuitry 1806, front-end module (FEM) circuitry 1808 and one or more antennas 1810, coupled together at least as shown.

The application circuitry 1802 can include one or more application processors. For example, the application circuitry 1802 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The processor(s) can include any combination of general-purpose processors and dedicated processors (e.g., graphics processors, application processors, etc.). The processors can be coupled with and/or can include a storage medium 1812, and can be configured to execute instructions stored in the storage medium 1812 to enable various applications and/or operating systems to run on the system.

The baseband circuitry 1804 can include circuitry such as, but not limited to, one or more single-core or multi-core processors. The baseband circuitry 1804 can include one or more baseband processors and/or control logic to process baseband signals received from a receive signal path of the RF circuitry 1806 and to generate baseband signals for a transmit signal path of the RF circuitry 1806. Baseband processing circuitry 1804 can interface with the application circuitry 1802 for generation and processing of the baseband signals and for controlling operations of the RF circuitry 1806. For example, in some aspects, the baseband circuitry 1804 can include a second generation (2G) baseband processor 1804a, third generation (3G) baseband processor 1804b, fourth generation (4G) baseband processor 1804c, and/or other baseband processor(s) 1804d for other existing generations, generations in development or to be developed in the future (e.g., fifth generation (5G), 6G, etc.). The baseband circuitry 1804 (e.g., one or more of baseband processors 1804a-d) can handle various radio control functions that enable communication with one or more radio networks via the RF circuitry 1806. The radio control functions can include, but are not limited to, signal modulation/demodulation, encoding/decoding, radio frequency shifting, etc. In some aspects, modulation/demodulation circuitry of the baseband circuitry 1804 can include Fast-Fourier Transform (FFT), precoding, and/or constellation mapping/demapping functionality. In some aspects, encoding/decoding circuitry of the baseband circuitry 1804 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1804 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1804e of the baseband circuitry 1804 can be configured to run elements of the protocol stack for signaling of the PHY, MAC, RLC, PDCP and/or RRC layers. In some aspects, the baseband circuitry can include one or more audio digital signal processor(s) (DSP) 1804f. The audio DSP(s) 1804f can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1804 and the application circuitry 1802 can be implemented together such as, for example, on a system on a chip (SOC).

In some aspects, the baseband circuitry 1804 can provide for communication compatible with one or more radio technologies. For example, in some aspects, the baseband circuitry 1804 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1804 is configured to support radio communications of more than one wireless protocol can be referred to as multi-mode baseband circuitry.

RF circuitry 1806 can enable communication with wireless networks using modulated electromagnetic radiation through a non-solid medium. In various aspects, the RF circuitry 1806 can include switches, filters, amplifiers, etc. to facilitate the communication with the wireless network. RF circuitry 1806 can include a receive signal path which can include circuitry to down-convert RF signals received from the FEM circuitry 1808 and provide baseband signals to the baseband circuitry 1804. RF circuitry 1806 can also include a transmit signal path which can include circuitry to up-convert baseband signals provided by the baseband circuitry 1804 and provide RF output signals to the FEM circuitry 1808 for transmission.

In some aspects, the RF circuitry 1806 can include a receive signal path and a transmit signal path. The receive signal path of the RF circuitry 1806 can include mixer circuitry 1806a, amplifier circuitry 1806b and filter circuitry 1806c. The transmit signal path of the RF circuitry 1806 can include filter circuitry 1806c and mixer circuitry 1806a. RF circuitry 1806 can also include synthesizer circuitry 1806d for synthesizing a frequency for use by the mixer circuitry 1806a of the receive signal path and the transmit signal path. In some aspects, the mixer circuitry 1806a of the receive signal path can be configured to down-convert RF signals received from the FEM circuitry 1808 based on the synthesized frequency provided by synthesizer circuitry 1806d. The amplifier circuitry 1806b can be configured to amplify the down-converted signals and the filter circuitry 1806c can be a low-pass filter (LPF) or band-pass filter (BPF) configured to remove unwanted signals from the down-converted signals to generate output baseband signals. Output baseband signals can be provided to the baseband circuitry 1804 for further processing. In some aspects, the output baseband signals can be zero-frequency baseband signals, although the output baseband signals do not have to be zero-frequency baseband signals. In some aspects, mixer circuitry 1806a of the receive signal path can comprise passive mixers, although the scope of the aspects is not limited in this respect.

In some aspects, the mixer circuitry 1806a of the transmit signal path can be configured to up-convert input baseband signals based on the synthesized frequency provided by the synthesizer circuitry 1806d to generate RF output signals for the FEM circuitry 1808. The baseband signals can be provided by the baseband circuitry 1804 and can be filtered by filter circuitry 1806c. The filter circuitry 1806c can include a low-pass filter (LPF), although the scope of the aspects is not limited in this respect.

In some aspects, the mixer circuitry 1806a of the receive signal path and the mixer circuitry 1806a of the transmit signal path can include two or more mixers and can be arranged for quadrature downconversion and/or upconversion respectively. In some aspects, the mixer circuitry 1806a of the receive signal path and the mixer circuitry 1806a of the transmit signal path can include two or more mixers and can be arranged for image rejection (e.g., Hartley image rejection). In some aspects, the mixer circuitry 1806a of the receive signal path and the mixer circuitry 1806a can be arranged for direct downconversion and/or direct upconversion, respectively. In some aspects, the mixer circuitry 1806a of the receive signal path and the mixer circuitry 1806a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1806 can include analog-to-digital converter (ADC) and digital-to-analog converter (DAC) circuitry and the baseband circuitry 1804 can include a digital baseband interface to communicate with the RF circuitry 1806.

In some dual-mode embodiments, a separate radio IC circuitry can be provided for processing signals for each spectrum, although the scope of the embodiments is not limited in this respect.

In some embodiments, the synthesizer circuitry 1806d can be a fractional-N synthesizer or a fractional N/N+1 synthesizer, although the scope of the embodiments is not limited in this respect as other types of frequency synthesizers can be suitable. For example, synthesizer circuitry 1806d can be a delta-sigma synthesizer, a frequency multiplier, or a synthesizer comprising a phase-locked loop with a frequency divider.

The synthesizer circuitry 1806d can be configured to synthesize an output frequency for use by the mixer circuitry 1806a of the RF circuitry 1806 based on a frequency input and a divider control input. In some embodiments, the synthesizer circuitry 1806d can be a fractional N/N+1 synthesizer.

In some embodiments, frequency input can be provided by a voltage controlled oscillator (VCO), although that is not a constraint. Divider control input can be provided by either the baseband circuitry 1804 or the applications processor 1802 depending on the desired output frequency. In some embodiments, a divider control input (e.g., N) can be determined from a look-up table based on a channel indicated by the applications processor 1802.

Synthesizer circuitry 1806d of the RF circuitry 1806 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1806d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1806 can include an IQ/polar converter.

FEM circuitry 1808 can include a receive signal path which can include circuitry configured to operate on RF signals received from one or more antennas 1810, amplify the received signals and provide the amplified versions of the received signals to the RF circuitry 1806 for further processing. FEM circuitry 1808 can also include a transmit signal path which can include circuitry configured to amplify signals for transmission provided by the RF circuitry 1806 for transmission by one or more of the one or more antennas 1810.

In some embodiments, the FEM circuitry 1808 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1806). The transmit signal path of the FEM circuitry 1808 can include a power amplifier (PA) to amplify input RF signals (e.g., provided by RF circuitry 1806), and one or more filters to generate RF signals for subsequent transmission (e.g., by one or more of the one or more antennas 1810.

In some embodiments, the UE device 1800 can include additional elements such as, for example, memory/storage, display, camera, sensor, and/or input/output (I/O) interface.

Figure 19:
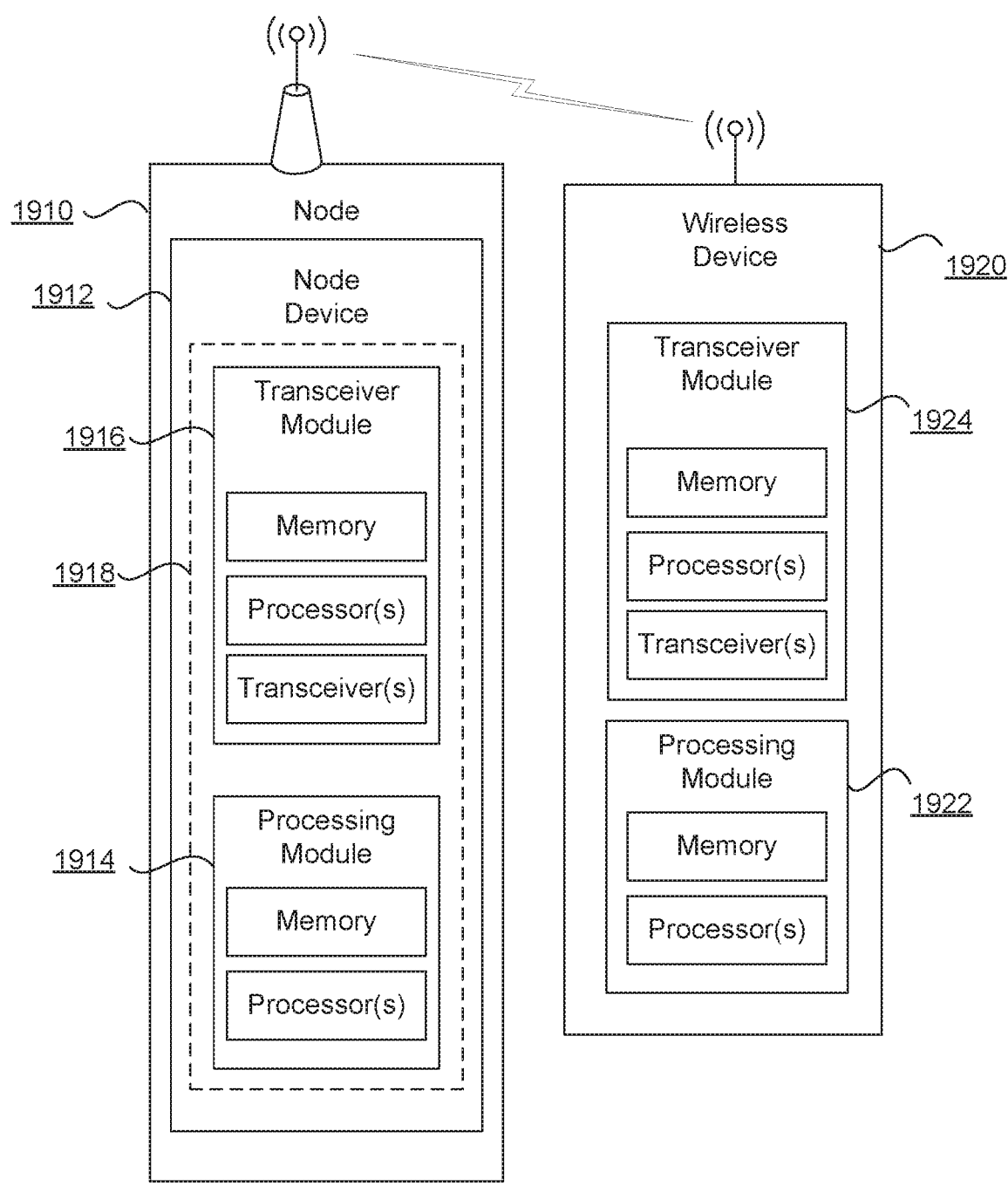
FIG. 19 illustrates a diagram of a node (e.g., eNB) and wireless device (e.g., UE) in accordance with an example.

FIG. 19 illustrates a diagram 1900 of a node 1910 (e.g., eNB and/or a base station) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1910 can include a node device 1912. The node device 1912 or the node 1910 can be configured to communicate with the wireless device 1920. The node device 1912 can be configured to implement the technology described. The node device 1912 can include a processing module 1914 and a transceiver module 1916. In one aspect, the node device 1912 can include the transceiver module 1916 and the processing module 1914 forming a circuitry 1918 for the node 1910. In one aspect, the transceiver module 1916 and the processing module 1914 can form a circuitry of the node device 1912. The processing module 1914 can include one or more processors and memory. In one embodiment, the processing module 1922 can include one or more application processors. The transceiver module 1916 can include a transceiver and one or more processors and memory. In one embodiment, the transceiver module 1916 can include a baseband processor.

The wireless device 1920 can include a transceiver module 1924 and a processing module 1922. The processing module 1922 can include one or more processors and memory. In one embodiment, the processing module 1922 can include one or more application processors. The transceiver module 1924 can include a transceiver and one or more processors and memory. In one embodiment, the transceiver module 1924 can include a baseband processor. The wireless device 1920 can be configured to implement the technology described. The node 1910 and the wireless devices 1920 can also include one or more storage mediums, such as the transceiver module 1916, 1924 and/or the processing module 1914, 1922. In one aspect, the components described herein of the transceiver module 1916 can be included in one or more separate devices that may used in a cloud-RAN (C-RAN) environment.

EXAMPLE

The following examples pertain to specific invention embodiments and point out specific features, elements, or steps that can be used or otherwise combined in achieving such embodiments.

Example 1 includes an apparatus of an eNodeB, the eNodeB configured to communicate with a User Equipment (UE), the apparatus comprising one or more processors and memory configured to: generate, for transmission to the UE, a downlink (DL) self-contained time division duplex (TDD) subframe comprising an extended physical downlink shared channel (xPDSCH), an extended physical downlink control channel (xPDCCH), a DL spacing signal, and a guard period, wherein the xPDSCH, the xPDCCH, the DL spacing signal, and the guard period are located within the DL self-contained TDD subframe prior to an extended physical uplink control channel (xPUCCH); and process, an uplink (UL) self-contained TDD subframe, received from the UE, having a UL spacing signal located before after an extended physical uplink shared channel (xPUSCH).

Example 2 includes the apparatus of example 1, wherein the DL spacing signal is at least one of a broadcast signal, a sounding signal, a tracking signal, or a synchronization signal, and the UL spacing signal is at least one of the broadcast signal, the sounding signal, the tracking signal, or the synchronization signal.

Example 3 includes the apparatus of example 1 or 2, wherein the one or more processors and memory are further configured to: schedule DL data transmission and UL data transmission using aggregated self-contained TDD subframes; or process, for transmission to the UE, an indication for using the aggregated self-contained TDD subframes.

Example 4 includes the apparatus of example 1, wherein the DL spacing signal is inserted within the DL self-contained TDD subframe after the xPDSCH and prior to the guard period.

Example 5 includes the apparatus of example 1, wherein the DL self-contained TDD subframe contains one or more fields.

Example 6 includes the apparatus of example 1 or 5, wherein the one or more fields include at least: the xPDCCH, the xPDSCH, the guard period; the UL spacing signal, and the xPUCCH; the xPDCCH, a first xPDSCH, a second xPDSCH, the guard period, and the xPUCCH; or the xPDSCH, the xPDCCH, the guard period, and the xPUCCH, wherein the xPDCCH is used to schedule the xPDSCH in a second DL self-contained TDD subframe.

Example 7 includes the apparatus of example 1, wherein the one or more processors and memory are further configured to: perform different channel coding and modulation schemes; separate a cyclic redundancy check (CRC) attachment and the first xPDSCH and the second xPDSCH contained within the second DL self-contained TDD subframe; process, for transmission to the UE, a hybrid automatic repeat request (HARQ)-acknowledgment (ACK) (HARQ-ACK) for the xPDSCH transmitted via the xPUCCH; or process, for transmission to the UE, a first HARQ-ACK for the first xPDSCH transmitted via the xPUCCH in a first subframe and a second HARQ-ACK for the second xPDSCH via the xPUCCH in a second DL self-contained TDD subframe.

Example 8 includes the apparatus of example 1 or 2, wherein a number of self-contained TDD subframes used for the xPDSCH or the xPUSCH for data transmissions within the aggregated self-contained TDD subframes are indicated in the DCI format for the DL assignment and the UL grant.

Example 9 includes the apparatus of example 1 or 8, wherein the number of self-contained TDD subframes within the aggregated self-contained TDD subframes are defined within one subset of the aggregated self-contained TDD subframes, wherein the subset is predefined or configured by higher layers via an extended master information block (xMIB), an extended system information block (xSIB), or a UE specific dedicated radio resource control (RRC) signalling.

Example 10 includes the apparatus of example 1, wherein a number of self-contained TDD subframes used for the xPDSCH or the xPUSCH data transmission within the aggregated self-contained TDD subframes are indicated via the extended xMIB, the extended xSIB, or a UE dedicated RRC signalling.

Example 11 includes the apparatus of example 1 or 10, wherein the number of self-contained TDD subframes used for the xPDSCH or the xPUSCH transmission is signaled via a dedicated signal or a channel in the DL data transmission.

Example 12 includes the apparatus of example 1, wherein the one or more processors and memory are further configured to: reuse a Physical Control Format Indicator Channel (PCFICH) (e.g., a 3GPP long-term evolution (LTE) Rel. 12 Physical Control Format Indicator Channel (PCFICH)) to indicate a number of self-contained TDD subframes; use a physical TDD configuration indicator channel (PTCICH) to indicate the number of self-contained TDD subframes; or use a downlink control information (DCI) format, the xMIB, the xSIB, the UE dedicated RRC signalling, a dedicated signal or a channel in the DL data transmission, or a combination thereof to indicate a number of self-contained TDD subframes.

Example 13 includes the apparatus of example 1 or 12, wherein the one or more processors and memory are further configured to: predefine a subset of aggregated levels for the aggregated self-contained TDD subframes; use the PCFICH to indicate one of the aggregation levels in the subset; use cross-subframe scheduling and cross-carrier scheduling to schedule the xPDSCH or the xPUSCH for the aggregated self-contained TDD subframes; or employ an aggregated Hybrid automatic repeat request (HARQ) acknowledgement (ACK)/negative ACK (ACK/NACK) mechanism for one or more UEs scheduled within an aggregated self-contained TDD subframe window; wherein the one or more UEs feedback the HARQ ACK/NACK via the xPUCCH in a last subframe of the aggregated self-contained TDD subframe window, wherein a gap between the xPDSCH or the xPUSCH data transmission and HARQ ACK/NACK feedback is indicated in a downlink control information (DCI) format for a DL assignment or an UL grant.

Example 14 includes the apparatus of example 1, wherein a resource index for the HARQ ACK/NACK feedback on the xPUCCH is defined as a UE specific parameter, which is signaled via a UE specific RRC signalling, or the resource index for the HARQ ACK/NACK feedback on the xPUCCH is determined as a function of a subframe index within a maximum aggregation level and one or more parameters that include at least a De-Modulation Reference Signal (DM-RS) sequence index for an associated xPDSCH transmission or xPUSCH transmission.

Example 15 includes the apparatus of example 1 or 14, wherein the one or more processors and memory are further configured to: use cross-carrier HARQ ACK/NACK feedback; use a component carrier (CC) index for the HARQ ACK/NACK feedback transmission which is explicitly indicated in the DCI format for DL assignment or UL grant; or use a UE specific RRC signalling, wherein a resource index for the HARQ ACK/NACK feedback on the xPUCCH is defined as a UE specific parameter which is signaled via the UE specific RRC signalling or determined as a function of the CC index for the data transmission and one or more parameters, that include at least a De-Modulation Reference Signal (DM-RS) sequence index for the associated xPDSCH transmission or xPUSCH transmission.

Example 16 includes an apparatus of a user equipment (UE), the UE configured to communicate with an eNodeB, the apparatus comprising one or more processors and memory configured to: process a downlink (DL) self-contained time division duplex (TDD) subframe, received from the eNodeB, comprising an extended physical downlink shared channel (xPDSCH), an extended physical downlink control channel (xPDCCH), a DL spacing signal, and a guard period, wherein the xPDSCH, the xPDCCH, the DL spacing signal, and the guard period are located within the DL self-contained TDD subframe prior to an extended physical uplink control channel (xPUCCH); and generate, for transmission to the eNodeB, an uplink (UL) self-contained TDD subframe after an extended physical uplink shared channel (xPUSCH) having an UL spacing signal located before or after the xPUSCH.

Example 17 includes the apparatus of example 16, wherein the one or more processors and memory are further configured to process an indication, received from the eNodeB, for using aggregated self-contained TDD subframes.

Example 18 includes the apparatus of example 16 or 17, wherein the DL spacing signal is at least one of a broadcast signal, a sounding signal, a tracking signal, or a synchronization signal, and the UL spacing signal is at least one of the broadcast signal, the sounding signal, the tracking signal, or the synchronization signal, and wherein the DL spacing signal is inserted within the DL self-contained TDD subframe after the xPDSCH and prior to the guard period.

Example 19 includes the apparatus of example 16 or 18, wherein the DL self-contained TDD subframe contains one or more fields, the one or more fields include at least: the xPDCCH, the xPDSCH, the guard period; the UL spacing signal, and the xPUCCH; the xPDCCH, a first xPDSCH, a second xPDSCH, the guard period, and the xPUCCH; or the xPDSCH, the xPDCCH, the guard period, and the xPUCCH, wherein the xPDCCH is used to schedule the xPDSCH in a second DL self-contained TDD subframe.

Example 20 includes the apparatus of example 16, wherein the one or more processors and memory are further configured to: process a hybrid automatic repeat request (HARQ)-acknowledgment (ACK) (HARQ-ACK) for the xPDSCH transmitted via the xPUCCH; or process a first HARQ-ACK for the first xPDSCH transmitted via the xPUCCH in a first subframe and a second HARQ-ACK for the second xPDSCH via the xPUCCH in a second DL self-contained TDD subframe.

Example 21 includes the apparatus of example 16, wherein: a number of self-contained TDD subframes used for the xPDSCH or the xPUSCH for data transmissions within the aggregated self-contained TDD subframes are indicated in the DCI format for the DL assignment and the UL grant; the number of self-contained TDD subframes within the aggregated self-contained TDD subframes are defined within one subset of the aggregated self-contained TDD subframes, wherein the subset is predefined or configured by higher layers via an extended master information block (xMIB), an extended system information block (xSIB), or a UE specific dedicated radio resource control (RRC) signalling; the number of self-contained TDD subframes used for the xPDSCH or the xPUSCH data transmission within the aggregated self-contained TDD subframes are indicated via the extended xMIB, the extended xSIB, or the UE dedicated RRC signalling; the number of self-contained TDD subframes used for the xPDSCH or the xPUSCH transmission is signaled via a dedicated signal or a channel in the DL data transmission; a Physical Control Format Indicator Channel (PCFICH) (e.g., a 3GPP long term evolution (LTE) Rel. 12 Physical Control Format Indicator Channel (PCFICH)) indicates the number of self-contained TDD subframes; a physical TDD configuration indicator channel (PTCICH) indicates the number of self-contained TDD subframes; or the DCI format, the extended xMIB, the extended xSIB, a UE dedicated RRC signalling, the dedicated signal or the channel in the DL data transmission, or a combination thereof indicates the number of self-contained TDD subframes.

Example 22 includes the apparatus of example 16 or 21, wherein: a subset of aggregated levels for the aggregated self-contained TDD subframes is predefined; the PCFICH indicates one of the aggregation levels in the subset; the xPDSCH and the xPUSCH for the aggregated self-contained TDD subframes is scheduled using cross-subframe scheduling, cross-carrier scheduling, or a combination thereof; or an aggregated Hybrid automatic repeat request (HARQ) acknowledgement (ACK)/negative ACK (NACK) mechanism is used for the UE and one or more additional UEs scheduled within an aggregated self-contained TDD subframe window; wherein the UE and the one or more one or more additional UEs each feedback the HARQ ACK/NACK via the xPUCCH in a last subframe of the aggregated self-contained TDD subframe window, wherein a gap between the xPDSCH or the xPUSCH data transmission and the HARQ ACK/NACK feedback is indicated in a DCI format for a DL assignment or an UL grant.

Example 23 includes the apparatus of example 16, wherein a resource index for the HARQ ACK/NACK feedback on the xPUCCH is defined as a UE specific parameter, which is signaled via a UE specific RRC signalling, or the resource index for the HARQ ACK/NACK feedback on the xPUCCH is determined as a function of a subframe index within a maximum aggregation level and one or more parameters including at least a De-Modulation Reference Signal (DM-RS) sequence index for an associated xPDSCH transmission or xPUSCH transmission.

Example 24 includes the apparatus of example 16 or 23, wherein the one or more processors and memory are further configured to: use a cross-carrier for providing HARQ ACK/NACK feedback; use a component carrier (CC) index for providing the HARQ ACK/NACK feedback indicated in the DCI format for DL assignment or UL grant, wherein a resource index for the HARQ ACK/NACK feedback on the xPUCCH is defined as a UE specific parameter which is signaled via the UE specific RRC signalling or determined as a function of the CC index for the data transmission and one or more parameters including at least a De-Modulation Reference Signal (DM-RS) sequence index for the associated xPDSCH transmission or the xPUSCH transmission.

Example 25 includes the apparatus of example 16, wherein the apparatus includes at least one of an antenna, a touch sensitive display screen, a speaker, a microphone, a graphics processor, an application processor, a baseband processor, an internal memory, a non-volatile memory port, and combinations thereof.

Example 26 includes at least one machine readable storage medium having instructions embodied thereon for an eNodeB to communicate with a User Equipment (UE), the instructions when executed cause the eNodeB to: generate, for transmission to the UE, a downlink (DL) self-contained time division duplex (TDD) subframe comprising an extended physical downlink shared channel (xPDSCH), an extended physical downlink control channel (xPDCCH), a DL spacing signal, and a guard period, wherein the xPDSCH, the xPDCCH, the DL spacing signal, and the guard period are located within the DL self-contained TDD subframe prior to an extended physical uplink control channel (xPUCCH); process, an uplink (UL) self-contained TDD subframe, received from the UE, having a UL spacing signal located before or after a extended physical uplink shared channel (xPUSCH); schedule DL data transmission and UL data transmission using aggregated self-contained TDD subframes; and process, for transmission to the UE, an indication for using the aggregated self-contained TDD subframes.

Example 27 includes the at least one machine readable storage medium of example 26, wherein the plurality of signal types include at least a downlink (DL) sounding reference signal (SRS), channel state information reference signal (CSI-RS), a broadcast signal, and a synchronization signal.

Example 28 includes the at least one machine readable storage medium of example 26 or 27, further comprising instructions which when executed cause the eNodeB to: separate a cyclic redundancy check (CRC) attachment an the first xPDSCH and the second xPDSCH within a same DL self-contained TDD subframe; process, for transmission to the UE, a hybrid automatic repeat request (HARQ)-acknowledgment (ACK) (HARQ-ACK) for the xPDSCH; use Physical Control Format Indicator Channel (PCFICH) (e.g., a 3GPP long term evolution (LTE) Rel. 12 Physical Control Format Indicator Channel (PCFICH)) to indicate a number of self-contained TDD subframes; use a physical TDD configuration indicator channel (PTCICH) to indicate the number of self-contained TDD subframes; use a DCI format, an extended master information block (xMIB), an extended system information block (xSIB), or a UE specific dedicated radio resource control (RRC) signalling, a dedicated signal or a channel in the DL data transmission, or a combination thereof to indicate the number of self-contained TDD subframes; predefine a subset of aggregated levels for the aggregated self-contained TDD subframes; or use a Physical Control Format Indicator Channel (PCFICH) (e.g., a 3GPP long term evolution (LTE) Rel. 12 Physical Control Format Indicator Channel (PCFICH)) to indicate one of the aggregation levels in the subset.

Example 29 includes the at least one machine readable storage medium of example 26, further comprising instructions which when executed cause the eNodeB to: use cross-subframe scheduling and/or cross-carrier scheduling to schedule the xPDSCH and the xPUSCH for the aggregated self-contained TDD subframes; or employ an aggregated Hybrid automatic repeat request (HARQ) acknowledgement (ACK)/negative ACK (NACK) mechanism for one or more UEs scheduled within an aggregated self-contained TDD subframe window, wherein the one or more UEs feedback the HARQ ACK/NACK via the xPUCCH in a last subframe of the aggregated self-contained TDD subframe window, wherein a gap between the xPDSCH or the xPUSCH data transmission and HARQ ACK/NACK feedback is indicated in the DCI format for the DL assignment or the UL grant.

Example 30 includes the at least one machine readable storage medium of example 26 or 29, further comprising instructions which when executed cause the eNodeB to: use cross-carrier HARQ ACK/NACK feedback; or use a component carrier (CC) index for the HARQ ACK/NACK feedback transmission is explicitly indicated in the DCI format for DL assignment or UL grant, wherein a resource index for the HARQ ACK/NACK feedback on the xPUCCH is defined as a UE specific parameter which is signaled via the UE specific RRC signalling or determined as a function of the CC index for the data transmission and one or more parameters including De-Modulation Reference Signal (DM-RS) sequence index for the associated xPDSCH or xPUSCH transmission.

Example 31 includes an apparatus of an eNodeB, the eNodeB configured to communicate with a User Equipment (UE), the apparatus comprising one or more processors and memory configured to: generate, for transmission to the UE, a downlink (DL) self-contained time division duplex (TDD) subframe comprising an extended physical downlink shared channel (xPDSCH), an extended physical downlink control channel (xPDCCH), a DL spacing signal, and a guard period, wherein the xPDSCH, the xPDCCH, the DL spacing signal, and the guard period are located within the DL self-contained TDD subframe prior to an extended physical uplink control channel (xPUCCH); and process, an uplink (UL) self-contained TDD subframe, received from the UE, having a UL spacing signal located before after an extended physical uplink shared channel (xPUSCH).

Example 32 includes the apparatus of example 31, wherein the DL spacing signal is at least one of a broadcast signal, a sounding signal, a tracking signal, or a synchronization signal, and the UL spacing signal is at least one of the broadcast signal, the sounding signal, the tracking signal, or the synchronization signal.

Example 33 includes the apparatus of example 31, wherein the one or more processors and memory are further configured to: schedule DL data transmission and UL data transmission using aggregated self-contained TDD subframes; or process, for transmission to the UE, an indication for using the aggregated self-contained TDD subframes.

Example 34 includes the apparatus of example 31, wherein the DL spacing signal is inserted within the DL self-contained TDD subframe after the xPDSCH and prior to the guard period.

Example 35 includes the apparatus of example 31, wherein the DL self-contained TDD subframe contains one or more fields.

Example 36 includes the apparatus of example 35, wherein the one or more fields include at least: the xPDCCH, the xPDSCH, the guard period; the UL spacing signal, and the xPUCCH; the xPDCCH, a first xPDSCH, a second xPDSCH, the guard period, and the xPUCCH; or the xPDSCH, the xPDCCH, the guard period, and the xPUCCH, wherein the xPDCCH is used to schedule the xPDSCH in a second DL self-contained TDD subframe.

Example 37 includes the apparatus of example 31, wherein the one or more processors and memory are further configured to: perform different channel coding and modulation schemes; and separate a cyclic redundancy check (CRC) attachment and the first xPDSCH and the second xPDSCH contained within the second DL self-contained TDD subframe; process, for transmission to the UE, a hybrid automatic repeat request (HARQ)-acknowledgment (ACK) (HARQ-ACK) for the xPDSCH transmitted via the xPUCCH; or process, for transmission to the UE, a first HARQ-ACK for the first xPDSCH transmitted via the xPUCCH in a first subframe and a second HARQ-ACK for the second xPDSCH via the xPUCCH in a second DL self-contained TDD subframe.

Example 38 includes the apparatus of example 31, wherein a number of self-contained TDD subframes used for the xPDSCH or the xPUSCH for data transmissions within the aggregated self-contained TDD subframes are indicated in the DCI format for the DL assignment and the UL grant.

Example 39 includes the apparatus of example 38, wherein the number of self-contained TDD subframes within the aggregated self-contained TDD subframes are defined within one subset of the aggregated self-contained TDD subframes, wherein the subset is predefined or configured by higher layers via an extended master information block (xMIB), an extended system information block (xSIB), or a UE specific dedicated radio resource control (RRC) signalling.

Example 40 includes the apparatus of example 31, wherein a number of self-contained TDD subframes used for the xPDSCH or the xPUSCH data transmission within the aggregated self-contained TDD subframes are indicated via the extended xMIB, the extended xSIB, or a UE dedicated RRC signalling.

Example 41 includes the apparatus of example 40, wherein the number of self-contained TDD subframes used for the xPDSCH or the xPUSCH transmission is signaled via a dedicated signal or a channel in the DL data transmission.

Example 42 includes the apparatus of example 31, wherein the one or more processors and memory are further configured to: reuse a Physical Control Format Indicator Channel (PCFICH) (e.g., a 3GPP long term evolution (LTE) Rel. 12 Physical Control Format Indicator Channel (PCFICH)) to indicate a number of self-contained TDD subframes; use a physical TDD configuration indicator channel (PTCICH) to indicate the number of self-contained TDD subframes; or use a downlink control information (DCI) format, the xMIB, the xSIB, the UE dedicated RRC signalling, a dedicated signal or a channel in the DL data transmission, or a combination thereof to indicate a number of self-contained TDD subframes.

Example 43 includes the apparatus of example 31, wherein the one or more processors and memory are further configured to: predefine a subset of aggregated levels for the aggregated self-contained TDD subframes; use the PCFICH to indicate one of the aggregation levels in the subset; use cross-subframe scheduling and cross-carrier scheduling to schedule the xPDSCH or the xPUSCH for the aggregated self-contained TDD subframes; or employ an aggregated Hybrid automatic repeat request (HARQ) acknowledgement (ACK)/negative ACK (ACK/NACK) mechanism for one or more UEs scheduled within an aggregated self-contained TDD subframe window; wherein the one or more UEs feedback the HARQ ACK/NACK via the xPUCCH in a last subframe of the aggregated self-contained TDD subframe window, wherein a gap between the xPDSCH or the xPUSCH data transmission and HARQ ACK/NACK feedback is indicated in a downlink control information (DCI) format for a DL assignment or an UL grant.

Example 44 includes the apparatus of example 31, wherein a resource index for the HARQ ACK/NACK feedback on the xPUCCH is defined as a UE specific parameter, which is signaled via a UE specific RRC signalling, or the resource index for the HARQ ACK/NACK feedback on the xPUCCH is determined as a function of a subframe index within a maximum aggregation level and one or more parameters that include at least a De-Modulation Reference Signal (DM-RS) sequence index for an associated xPDSCH transmission or xPUSCH transmission.

Example 45 includes the apparatus of example 31, wherein the one or more processors and memory are further configured to: use cross-carrier HARQ ACK/NACK feedback; use a component carrier (CC) index for the HARQ ACK/NACK feedback transmission which is explicitly indicated in the DCI format for DL assignment or UL grant; or use a UE specific RRC signalling, wherein a resource index for the HARQ ACK/NACK feedback on the xPUCCH is defined as a UE specific parameter which is signaled via the UE specific RRC signalling or determined as a function of the CC index for the data transmission and one or more parameters, that include at least a De-Modulation Reference Signal (DM-RS) sequence index for the associated xPDSCH transmission or xPUSCH transmission.

Example 46 includes an apparatus of a user equipment (UE), the UE configured to communicate with an eNodeB, the apparatus comprising one or more processors and memory configured to: process a downlink (DL) self-contained time division duplex (TDD) subframe, received from the eNodeB, comprising an extended physical downlink shared channel (xPDSCH), an extended physical downlink control channel (xPDCCH), a DL spacing signal, and a guard period, wherein the xPDSCH, the xPDCCH, the DL spacing signal, and the guard period are located within the DL self-contained TDD subframe prior to an extended physical uplink control channel (xPUCCH); and generate, for transmission to the eNodeB, an uplink (UL) self-contained TDD subframe after an extended physical uplink shared channel (xPUSCH) having an UL spacing signal located before or after the xPUSCH Example 47 includes the apparatus of example 46, wherein the one or more processors and memory are further configured to process an indication, received from the eNodeB, for using aggregated self-contained TDD subframes.

Example 48 includes the apparatus of example 46, wherein the DL spacing signal is at least one of a broadcast signal, a sounding signal, a tracking signal, or a synchronization signal, and the UL spacing signal is at least one of the broadcast signal, the sounding signal, the tracking signal, or the synchronization signal, and wherein the DL spacing signal is inserted within the DL self-contained TDD subframe after the xPDSCH and prior to the guard period.

Example 49 includes the apparatus of example 48, wherein the DL self-contained TDD subframe contains one or more fields, the one or more fields include at least: the xPDCCH, the xPDSCH, the guard period; the UL spacing signal, and the xPUCCH; the xPDCCH, a first xPDSCH, a second xPDSCH, the guard period, and the xPUCCH; or the xPDSCH, the xPDCCH, the guard period, and the xPUCCH, wherein the xPDCCH is used to schedule the xPDSCH in a second DL self-contained TDD subframe.

Example 50 includes the apparatus of example 46, wherein the one or more processors and memory are further configured to: process a hybrid automatic repeat request (HARQ)-acknowledgment (ACK) (HARQ-ACK) for the xPDSCH transmitted via the xPUCCH; or process a first HARQ-ACK for the first xPDSCH transmitted via the xPUCCH in a first subframe and a second HARQ-ACK for the second xPDSCH via the xPUCCH in a second DL self-contained TDD subframe.

Example 51 includes the apparatus of example 46, wherein: a number of self-contained TDD subframes used for the xPDSCH or the xPUSCH for data transmissions within the aggregated self-contained TDD subframes are indicated in the DCI format for the DL assignment and the UL grant; the number of self-contained TDD subframes within the aggregated self-contained TDD subframes are defined within one subset of the aggregated self-contained TDD subframes, wherein the subset is predefined or configured by higher layers via an extended master information block (xMIB), an extended system information block (xSIB), or a UE specific dedicated radio resource control (RRC) signalling; the number of self-contained TDD subframes used for the xPDSCH or the xPUSCH data transmission within the aggregated self-contained TDD subframes are indicated via the extended xMIB, the extended xSIB, or the UE dedicated RRC signalling; the number of self-contained TDD subframes used for the xPDSCH or the xPUSCH transmission is signaled via a dedicated signal or a channel in the DL data transmission; a Physical Control Format Indicator Channel (PCFICH) (e.g., a 3GPP long term evolution (LTE) Rel. 12 Physical Control Format Indicator Channel (PCFICH)) indicates the number of self-contained TDD subframes; a physical TDD configuration indicator channel (PTCICH) indicates the number of self-contained TDD subframes; or the DCI format, the extended xMIB, the extended xSIB, a UE dedicated RRC signalling, the dedicated signal or the channel in the DL data transmission, or a combination thereof indicates the number of self-contained TDD subframes.

Example 52 includes the apparatus of example 46, wherein: a subset of aggregated levels for the aggregated self-contained TDD subframes is predefined; the PCFICH indicates one of the aggregation levels in the subset; the xPDSCH and the xPUSCH for the aggregated self-contained TDD subframes is scheduled using cross-subframe scheduling, cross-carrier scheduling, or a combination thereof or an aggregated Hybrid automatic repeat request (HARQ) acknowledgement (ACK)/negative ACK (NACK) mechanism is used for the UE and one or more additional UEs scheduled within an aggregated self-contained TDD subframe window; wherein the UE and the one or more one or more additional UEs each feedback the HARQ ACK/NACK via the xPUCCH in a last subframe of the aggregated self-contained TDD subframe window, wherein a gap between the xPDSCH or the xPUSCH data transmission and the HARQ ACK/NACK feedback is indicated in a DCI format for a DL assignment or an UL grant.

Example 53 includes the apparatus of example 46, wherein a resource index for the HARQ ACK/NACK feedback on the xPUCCH is defined as a UE specific parameter, which is signaled via a UE specific RRC signalling, or the resource index for the HARQ ACK/NACK feedback on the xPUCCH is determined as a function of a subframe index within a maximum aggregation level and one or more parameters including at least a De-Modulation Reference Signal (DM-RS) sequence index for an associated xPDSCH transmission or xPUSCH transmission.

Example 54 includes the apparatus of example 46, wherein the one or more processors and memory are further configured to: use a cross-carrier for providing HARQ ACK/NACK feedback; use a component carrier (CC) index for providing the HARQ ACK/NACK feedback indicated in the DCI format for DL assignment or UL grant, wherein a resource index for the HARQ ACK/NACK feedback on the xPUCCH is defined as a UE specific parameter which is signaled via the UE specific RRC signalling or determined as a function of the CC index for the data transmission and one or more parameters including at least a De-Modulation Reference Signal (DM-RS) sequence index for the associated xPDSCH transmission or the xPUSCH transmission.

Example 55 includes the apparatus of example 46, wherein the apparatus includes at least one of an antenna, a touch sensitive display screen, a speaker, a microphone, a graphics processor, an application processor, a baseband processor, an internal memory, a non-volatile memory port, and combinations thereof.

Example 56 includes at least one non-transitory machine readable storage medium having instructions embodied thereon for an eNodeB to communicate with a User Equipment (UE), the instructions when executed cause the eNodeB to: generate, for transmission to the UE, a downlink (DL) self-contained time division duplex (TDD) subframe comprising an extended physical downlink shared channel (xPDSCH), an extended physical downlink control channel (xPDCCH), a DL spacing signal, and a guard period, wherein the xPDSCH, the xPDCCH, the DL spacing signal, and the guard period are located within the DL self-contained TDD subframe prior to an extended physical uplink control channel (xPUCCH); process, an uplink (UL) self-contained TDD subframe, received from the UE, having a UL spacing signal located before or after a extended physical uplink shared channel (xPUSCH); schedule DL data transmission and UL data transmission using aggregated self-contained TDD subframes; and process, for transmission to the UE, an indication for using the aggregated self-contained TDD subframes.

Example 57 includes the at least one non-transitory machine readable storage medium of example 56, wherein the plurality of signal types include at least a downlink (DL) sounding reference signal (SRS), channel state information reference signal (CSI-RS), a broadcast signal, and a synchronization signal.

Example 58 includes the at least one non-transitory machine readable storage medium of example 56, further comprising instructions which when executed cause the eNodeB to: separate a cyclic redundancy check (CRC) attachment an the first xPDSCH and the second xPDSCH within a same DL self-contained TDD subframe; process, for transmission to the UE, a hybrid automatic repeat request (HARQ)-acknowledgment (ACK) (HARQ-ACK) for the xPDSCH; use a Physical Control Format Indicator Channel (PCFICH) (e.g., a 3GPP long term evolution (LTE) Rel. 12

Physical Control Format Indicator Channel (PCFICH)) to indicate a number of self-contained TDD subframes; use a physical TDD configuration indicator channel (PTCICH) to indicate the number of self-contained TDD subframes; use a DCI format, an extended master information block (xMIB), an extended system information block (xSIB), or a UE specific dedicated radio resource control (RRC) signalling, a dedicated signal or a channel in the DL data transmission, or a combination thereof to indicate the number of self-contained TDD subframes; predefine a subset of aggregated levels for the aggregated self-contained TDD subframes; or use a Physical Control Format Indicator Channel (PCFICH) (e.g., a 3GPP long term evolution (LTE) Rel. 12 Physical Control Format Indicator Channel (PCFICH)) to indicate one of the aggregation levels in the subset.

Example 59 includes the at least one non-transitory machine readable storage medium of example 56, further comprising instructions which when executed cause the eNodeB to: use cross-subframe scheduling and/or cross-carrier scheduling to schedule the xPDSCH and the xPUSCH for the aggregated self-contained TDD subframes; or employ an aggregated Hybrid automatic repeat request (HARQ) acknowledgement (ACK)/negative ACK (HACK) mechanism for one or more UEs scheduled within an aggregated self-contained TDD subframe window, wherein the one or more UEs feedback the HARQ ACK/NACK via the xPUCCH in a last subframe of the aggregated self-contained TDD subframe window, wherein a gap between the xPDSCH or the xPUSCH data transmission and HARQ ACK/NACK feedback is indicated in the DCI format for the DL assignment or the UL grant.

Example 60 includes the at least one non-transitory machine readable storage medium of example 56, further comprising instructions which when executed cause the eNodeB to: use cross-carrier HARQ ACK/NACK feedback; or use a component carrier (CC) index for the HARQ ACK/NACK feedback transmission is explicitly indicated in the DCI format for DL assignment or UL grant, wherein a resource index for the HARQ ACK/NACK feedback on the xPUCCH is defined as a UE specific parameter which is signaled via the UE specific RRC signalling or determined as a function of the CC index for the data transmission and one or more parameters including De-Modulation Reference Signal (DM-RS) sequence index for the associated xPDSCH or xPUSCH transmission.

Example 61 includes an apparatus of an eNodeB, the eNodeB configured to communicate with a User Equipment (UE), the apparatus comprising one or more processors and memory configured to: generate, for transmission to the UE, a downlink (DL) self-contained time division duplex (TDD) subframe comprising an extended physical downlink shared channel (xPDSCH), an extended physical downlink control channel (xPDCCH), a DL spacing signal, and a guard period, wherein the xPDSCH, the xPDCCH, the DL spacing signal, and the guard period are located within the DL self-contained TDD subframe prior to an extended physical uplink control channel (xPUCCH); and process, an uplink (UL) self-contained TDD subframe, received from the UE, having a UL spacing signal located before after an extended physical uplink shared channel (xPUSCH).

Example 62 includes the apparatus of example 61, wherein the DL spacing signal is at least one of a broadcast signal, a sounding signal, a tracking signal, or a synchronization signal, and the UL spacing signal is at least one of the broadcast signal, the sounding signal, the tracking signal, or the synchronization signal, or wherein the DL spacing signal is inserted within the DL self-contained TDD subframe after the xPDSCH and prior to the guard period.

Example 63 includes the apparatus of example 61 or 62, wherein the one or more processors and memory are further configured to: schedule DL data transmission and UL data transmission using aggregated self-contained TDD subframes; or process, for transmission to the UE, an indication for using the aggregated self-contained TDD subframes.

Example 64 includes the apparatus of example 61-63, wherein: the DL self-contained TDD subframe contains one or more fields; the xPDCCH, the xPDSCH, the guard period; the UL spacing signal, and the xPUCCH; the xPDCCH, a first xPDSCH, a second xPDSCH, the guard period, and the xPUCCH; or the xPDSCH, the xPDCCH, the guard period, and the xPUCCH, wherein the xPDCCH is used to schedule the xPDSCH in a second DL self-contained TDD subframe.

Example 65 includes the apparatus of example 61-64, wherein the one or more processors and memory are further configured to: perform different channel coding and modulation schemes; and separate a cyclic redundancy check (CRC) attachment and the first xPDSCH and the second xPDSCH contained within the second DL self-contained TDD subframe; process, for transmission to the UE, a hybrid automatic repeat request (HARQ)-acknowledgment (ACK) (HARQ-ACK) for the xPDSCH transmitted via the xPUCCH; or process, for transmission to the UE, a first HARQ-ACK for the first xPDSCH transmitted via the xPUCCH in a first subframe and a second HARQ-ACK for the second xPDSCH via the xPUCCH in a second DL self-contained TDD subframe.

Example 66 includes the apparatus of example 61-65, wherein a number of self-contained TDD subframes used for the xPDSCH or the xPUSCH for data transmissions within the aggregated self-contained TDD subframes are indicated in the DCI format for the DL assignment and the UL grant, wherein the number of self-contained TDD subframes within the aggregated self-contained TDD subframes are defined within one subset of the aggregated self-contained TDD subframes, wherein the subset is predefined or configured by higher layers via an extended master information block (xMIB), an extended system information block (xSIB), or a UE specific dedicated radio resource control (RRC) signalling, or wherein a number of self-contained TDD subframes used for the xPDSCH or the xPUSCH data transmission within the aggregated self-contained TDD subframes are indicated via the extended xMIB, the extended xSIB, or a UE dedicated RRC signalling.

Example 67 includes the apparatus of example 61-66, wherein the number of self-contained TDD subframes used for the xPDSCH or the xPUSCH transmission is signaled via a dedicated signal or a channel in the DL data transmission.

Example 68 includes the apparatus of example 61-67, wherein the one or more processors and memory are further configured to: reuse a Physical Control Format Indicator Channel (PCFICH) (e.g., a 3GPP long term evolution (LTE) Rel. 12 Physical Control Format Indicator Channel (PCFICH)) to indicate a number of self-contained TDD subframes; use a physical TDD configuration indicator channel (PTCICH) to indicate the number of self-contained TDD subframes; use a downlink control information (DCI) format, the xMIB, the xSIB, the UE dedicated RRC signalling, a dedicated signal or a channel in the DL data transmission, or a combination thereof to indicate a number of self-contained TDD subframes; predefine a subset of aggregated levels for the aggregated self-contained TDD subframes; use the PCFICH to indicate one of the aggregation levels in the subset; use cross-subframe scheduling and cross-carrier scheduling to schedule the xPDSCH or the xPUSCH for the aggregated self-contained TDD subframes; employ an aggregated Hybrid automatic repeat request (HARQ) acknowledgement (ACK)/negative ACK (ACK/NACK) mechanism for one or more UEs scheduled within an aggregated self-contained TDD subframe window; wherein the one or more UEs feedback the HARQ ACK/NACK via the xPUCCH in a last subframe of the aggregated self-contained TDD subframe window, wherein a gap between the xPDSCH or the xPUSCH data transmission and HARQ ACK/NACK feedback is indicated in a downlink control information (DCI) format for a DL assignment or an UL grant; use cross-carrier HARQ ACK/NACK feedback; use a component carrier (CC) index for the HARQ ACK/NACK feedback transmission which is explicitly indicated in the DCI format for DL assignment or UL grant; or use a UE specific RRC signalling, wherein a resource index for the HARQ ACK/NACK feedback on the xPUCCH is defined as a UE specific parameter which is signaled via the UE specific RRC signalling or determined as a function of the CC index for the data transmission and one or more parameters, that include at least a De-Modulation Reference Signal (DM-RS) sequence index for the associated xPDSCH transmission or xPUSCH transmission; wherein a resource index for the HARQ ACK/NACK feedback on the xPUCCH is defined as a UE specific parameter, which is signaled via a UE specific RRC signalling, or the resource index for the HARQ ACK/NACK feedback on the xPUCCH is determined as a function of a subframe index within a maximum aggregation level and one or more parameters that include at least a De-Modulation Reference Signal (DM-RS) sequence index for an associated xPDSCH transmission or xPUSCH transmission.

Example 69 includes an apparatus of a user equipment (UE), the UE configured to communicate with an eNodeB, the apparatus comprising one or more processors and memory configured to: process a downlink (DL) self-contained time division duplex (TDD) subframe, received from the eNodeB, comprising an extended physical downlink shared channel (xPDSCH), an extended physical downlink control channel (xPDCCH), a DL spacing signal, and a guard period, wherein the xPDSCH, the xPDCCH, the DL spacing signal, and the guard period are located within the DL self-contained TDD subframe prior to an extended physical uplink control channel (xPUCCH); and generate, for transmission to the eNodeB, an uplink (UL) self-contained TDD subframe after an extended physical uplink shared channel (xPUSCH) having an UL spacing signal located before or after the xPUSCH.

Example 70 includes the apparatus of example 69, wherein the one or more processors and memory are further configured to: process an indication, received from the eNodeB, for using aggregated self-contained TDD subframes, or wherein the DL spacing signal is at least one of a broadcast signal, a sounding signal, a tracking signal, or a synchronization signal, and the UL spacing signal is at least one of the broadcast signal, the sounding signal, the tracking signal, or the synchronization signal, and wherein the DL spacing signal is inserted within the DL self-contained TDD subframe after the xPDSCH and prior to the guard period; wherein the DL self-contained TDD subframe contains one or more fields, the one or more fields include at least: the xPDCCH, the xPDSCH, the guard period; the UL spacing signal, and the xPUCCH; the xPDCCH, a first xPDSCH, a second xPDSCH, the guard period, and the xPUCCH; the xPDSCH, the xPDCCH, the guard period, and the xPUCCH, wherein the xPDCCH is used to schedule the xPDSCH in a second DL self-contained TDD subframe; process a hybrid automatic repeat request (HARQ)-acknowledgment (ACK) (HARQ-ACK) for the xPDSCH transmitted via the xPUCCH; or process a first HARQ-ACK for the first xPDSCH transmitted via the xPUCCH in a first subframe and a second HARQ-ACK for the second xPDSCH via the xPUCCH in a second DL self-contained TDD subframe; wherein: a number of self-contained TDD subframes used for the xPDSCH or the xPUSCH for data transmissions within the aggregated self-contained TDD subframes are indicated in the DCI format for the DL assignment and the UL grant; the number of self-contained TDD subframes within the aggregated self-contained TDD subframes are defined within one subset of the aggregated self-contained TDD subframes, wherein the subset is predefined or configured by higher layers via an extended master information block (xMIB), an extended system information block (xSIB), or a UE specific dedicated radio resource control (RRC) signalling; the number of self-contained TDD subframes used for the xPDSCH or the xPUSCH data transmission within the aggregated self-contained TDD subframes are indicated via the extended xMIB, the extended xSIB, or the UE dedicated RRC signalling; the number of self-contained TDD subframes used for the xPDSCH or the xPUSCH transmission is signaled via a dedicated signal or a channel in the DL data transmission; a Physical Control Format Indicator Channel (PCFICH) (e.g., a 3GPP long term evolution (LTE) Rel. 12 Physical Control Format Indicator Channel (PCFICH)) indicates the number of self-contained TDD subframes; a physical TDD configuration indicator channel (PTCICH) indicates the number of self-contained TDD subframes; the DCI format, the extended xMIB, the extended xSIB, a UE dedicated RRC signalling, the dedicated signal or the channel in the DL data transmission, or a combination thereof indicates the number of self-contained TDD subframes; a subset of aggregated levels for the aggregated self-contained TDD subframes is predefined; the PCFICH indicates one of the aggregation levels in the subset; the xPDSCH and the xPUSCH for the aggregated self-contained TDD subframes is scheduled using cross-subframe scheduling, cross-carrier scheduling, or a combination thereof; or an aggregated Hybrid automatic repeat request (HARQ) acknowledgement (ACK)/negative ACK (NACK) mechanism is used for the UE and one or more additional UEs scheduled within an aggregated self-contained TDD subframe window; wherein the UE and the one or more one or more additional UEs each feedback the HARQ ACK/NACK via the xPUCCH in a last subframe of the aggregated self-contained TDD subframe window, wherein a gap between the xPDSCH or the xPUSCH data transmission and the HARQ ACK/NACK feedback is indicated in a DCI format for a DL assignment or an UL grant.

Example 71 includes the apparatus of example 69 or 70, wherein a resource index for the HARQ ACK/NACK feedback on the xPUCCH is defined as a UE specific parameter, which is signaled via a UE specific RRC signalling, or the resource index for the HARQ ACK/NACK feedback on the xPUCCH is determined as a function of a subframe index within a maximum aggregation level and one or more parameters including at least a De-Modulation Reference Signal (DM-RS) sequence index for an associated xPDSCH transmission or xPUSCH transmission, or wherein the apparatus includes at least one of an antenna, a touch sensitive display screen, a speaker, a microphone, a graphics processor, an application processor, a baseband processor, an internal memory, a non-volatile memory port, and combinations thereof.

In example 72, the subject matter of Example 69 or any of the Examples described herein may further include, wherein the one or more processors and memory are further configured to: use a cross-carrier for providing HARQ ACK/NACK feedback; use a component carrier (CC) index for providing the HARQ ACK/NACK feedback indicated in the DCI format for DL assignment or UL grant, wherein a resource index for the HARQ ACK/NACK feedback on the xPUCCH is defined as a UE specific parameter which is signaled via the UE specific RRC signalling or determined as a function of the CC index for the data transmission and one or more parameters including at least a De-Modulation Reference Signal (DM-RS) sequence index for the associated xPDSCH transmission or the xPUSCH transmission.

Example 73 includes at least one machine readable storage medium having instructions embodied thereon for an eNodeB to communicate with a User Equipment (UE), the instructions when executed cause the eNodeB to: generate, for transmission to the UE, a downlink (DL) self-contained time division duplex (TDD) subframe comprising an extended physical downlink shared channel (xPDSCH), an extended physical downlink control channel (xPDCCH), a DL spacing signal, and a guard period, wherein the xPDSCH, the xPDCCH, the DL spacing signal, and the guard period are located within the DL self-contained TDD subframe prior to an extended physical uplink control channel (xPUCCH); process, an uplink (UL) self-contained TDD subframe, received from the UE, having a UL spacing signal located before or after a extended physical uplink shared channel (xPUSCH); schedule DL data transmission and UL data transmission using aggregated self-contained TDD subframes; and process, for transmission to the UE, an indication for using the aggregated self-contained TDD subframes.

Example 74 includes the at least one machine readable storage medium of example 73, wherein the plurality of signal types include at least a downlink (DL) sounding reference signal (SRS), channel state information reference signal (CSI-RS), a broadcast signal, and a synchronization signal.

Example 75 includes the at least one machine readable storage medium of example 73 or 74, further comprising instructions which when executed cause the eNodeB to: separate a cyclic redundancy check (CRC) attachment an the first xPDSCH and the second xPDSCH within a same DL self-contained TDD subframe; process, for transmission to the UE, a hybrid automatic repeat request (HARQ)-acknowledgment (ACK) (HARQ-ACK) for the xPDSCH; use a Physical Control Format Indicator Channel (PCFICH) (e.g., a 3GPP long term evolution (LTE) Rel. 12 Physical Control Format Indicator Channel (PCFICH)) to indicate a number of self-contained TDD subframes; use a physical TDD configuration indicator channel (PTCICH) to indicate the number of self-contained TDD subframes; use a DCI format, an extended master information block (xMIB), an extended system information block (xSIB), or a UE specific dedicated radio resource control (RRC) signalling, a dedicated signal or a channel in the DL data transmission, or a combination thereof to indicate the number of self-contained TDD subframes; predefine a subset of aggregated levels for the aggregated self-contained TDD subframes; use a Physical Control Format Indicator Channel (PCFICH) (e.g., a 3GPP long term evolution (LTE) Rel. 12 Physical Control Format Indicator Channel (PCFICH)) to indicate one of the aggregation levels in the subset; use cross-subframe scheduling and/or cross-carrier scheduling to schedule the xPDSCH and the xPUSCH for the aggregated self-contained TDD subframes; employ an aggregated Hybrid automatic repeat request (HARQ) acknowledgement (ACK)/negative ACK (NACK) mechanism for one or more UEs scheduled within an aggregated self-contained TDD subframe window, wherein the one or more UEs feedback the HARQ ACK/NACK via the xPUCCH in a last subframe of the aggregated self-contained TDD subframe window, wherein a gap between the xPDSCH or the xPUSCH data transmission and HARQ ACK/NACK feedback is indicated in the DCI format for the DL assignment or the UL grant; use cross-carrier HARQ ACK/NACK feedback; or use a component carrier (CC) index for the HARQ ACK/NACK feedback transmission is explicitly indicated in the DCI format for DL assignment or UL grant, wherein a resource index for the HARQ ACK/NACK feedback on the xPUCCH is defined as a UE specific parameter which is signaled via the UE specific RRC signalling or determined as a function of the CC index for the data transmission and one or more parameters including De-Modulation Reference Signal (DM-RS) sequence index for the associated xPDSCH or xPUSCH transmission.

Example 76 includes a device to communicate with a User Equipment (UE), the device comprising: means for generating, for transmission to the UE, a downlink (DL) self-contained time division duplex (TDD) subframe comprising an extended physical downlink shared channel (xPDSCH), an extended physical downlink control channel (xPDCCH), a DL spacing signal, and a guard period, wherein the xPDSCH, the xPDCCH, the DL spacing signal, and the guard period are located within the DL self-contained TDD subframe prior to an extended physical uplink control channel (xPUCCH); means for processing, an uplink (UL) self-contained TDD subframe, received from the UE, having a UL spacing signal located before or after a extended physical uplink shared channel (xPUSCH); means for scheduling DL data transmission and UL data transmission using aggregated self-contained TDD subframes; and means for processing, for transmission to the UE, an indication for using the aggregated self-contained TDD subframes.

Example 77 includes the device of example 76, wherein the plurality of signal types include at least a downlink (DL) sounding reference signal (SRS), channel state information reference signal (CSI-RS), a broadcast signal, and a synchronization signal.

Example 78 includes the device of example 76 or 77, further comprising: means for separating a cyclic redundancy check (CRC) attachment an the first xPDSCH and the second xPDSCH within a same DL self-contained TDD subframe; means for processing, for transmission to the UE, a hybrid automatic repeat request (HARQ)-acknowledgment (ACK) (HARQ-ACK) for the xPDSCH; means for using a Physical Control Format Indicator Channel (PCFICH) (e.g., a 3GPP long term evolution (LTE) Rel. 12 Physical Control Format Indicator Channel (PCFICH)) to indicate a number of self-contained TDD subframes; means for using a physical TDD configuration indicator channel (PTCICH) to indicate the number of self-contained TDD subframes; means for using a DCI format, an extended master information block (xMIB), an extended system information block (xSIB), or a UE specific dedicated radio resource control (RRC) signalling, a dedicated signal or a channel in the DL data transmission, or a combination thereof to indicate the number of self-contained TDD subframes; means for predefining a subset of aggregated levels for the aggregated self-contained TDD subframes; or means for using a Physical Control Format Indicator Channel (PCFICH) (e.g., a 3GPP long term evolution (LTE) Rel. 12 Physical Control Format Indicator Channel (PCFICH)) to indicate one of the aggregation levels in the subset.

Example 79 includes the device of example 76, further comprising: means for cross-subframe scheduling and/or cross-carrier scheduling to schedule the xPDSCH and the xPUSCH for the aggregated self-contained TDD subframes; or means for employing an aggregated Hybrid automatic repeat request (HARQ) acknowledgement (ACK)/negative ACK (NACK) mechanism for one or more UEs scheduled within an aggregated self-contained TDD subframe window, wherein the one or more UEs feedback the HARQ ACK/NACK via the xPUCCH in a last subframe of the aggregated self-contained TDD subframe window, wherein a gap between the xPDSCH or the xPUSCH data transmission and HARQ ACK/NACK feedback is indicated in the DCI format for the DL assignment or the UL grant.

Example 80 includes the device of example 76 or 79, further comprising: means for using cross-carrier HARQ ACK/NACK feedback; or means for using a component carrier (CC) index for the HARQ ACK/NACK feedback transmission is explicitly indicated in the DCI format for DL assignment or UL grant, wherein a resource index for the HARQ ACK/NACK feedback on the xPUCCH is defined as a UE specific parameter which is signaled via the UE specific RRC signalling or determined as a function of the CC index for the data transmission and one or more parameters including De-Modulation Reference Signal (DM-RS) sequence index for the associated xPDSCH or xPUSCH transmission.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of an eNodeB, the eNodeB configured to communicate with a User Equipment (UE), the apparatus comprising one or more processors and memory configured to:
   generate, for transmission to the UE, a downlink (DL) self-contained time division duplex (TDD) subframe comprising an extended physical downlink shared channel (xPDSCH), an extended physical downlink control channel (xPDCCH), a DL spacing signal, and a guard period, wherein the xPDSCH, the xPDCCH, the DL spacing signal, and the guard period are located within the DL self-contained TDD subframe prior to an extended physical uplink control channel (xPUCCH); and
   process, an uplink (UL) self-contained TDD subframe, received from the UE, having a UL spacing signal located before or after an extended physical uplink shared channel (xPUSCH).

2. The apparatus of claim 1, wherein the DL spacing signal is at least one of a broadcast signal, a sounding signal, a tracking signal, or a synchronization signal, and the UL spacing signal is at least one of the broadcast signal, the sounding signal, the tracking signal, or the synchronization signal.

3. The apparatus of claim 1, wherein the one or more processors and memory are further configured to:
   schedule DL data transmission and UL data transmission using aggregated self-contained TDD subframes; or
   process, for transmission to the UE, an indication for using the aggregated self-contained TDD subframes.

4. The apparatus of claim 1, wherein the DL spacing signal is inserted within the DL self-contained TDD subframe after the xPDSCH and prior to the guard period.

5. The apparatus of claim 1, wherein the DL self-contained TDD subframe contains one or more fields.

6. The apparatus of claim 5, wherein the one or more fields include at least:
   the xPDCCH, the xPDSCH, the guard period; the UL spacing signal, and the xPUCCH;
   the xPDCCH, a first xPDSCH, a second xPDSCH, the guard period, and the xPUCCH; or
   the xPDSCH, the xPDCCH, the guard period, and the xPUCCH, wherein the xPDCCH is used to schedule the xPDSCH in a second DL self-contained TDD subframe.

7. The apparatus of claim 1, wherein the one or more processors and memory are further configured to:
   perform different channel coding and modulation schemes;
   separate a cyclic redundancy check (CRC) attachment and the first xPDSCH and the second xPDSCH contained within the second DL self-contained TDD subframe;
   process, for transmission to the UE, a hybrid automatic repeat request (HARQ)-acknowledgment (ACK) (HARQ-ACK) for the xPDSCH transmitted via the xPUCCH; or
   process, for transmission to the UE, a first HARQ-ACK for the first xPDSCH transmitted via the xPUCCH in a first subframe and a second HARQ-ACK for the second xPDSCH via the xPUCCH in a second DL self-contained TDD subframe.

8. The apparatus of claim 1, wherein a number of self-contained TDD subframes used for the xPDSCH or the xPUSCH for data transmissions within the aggregated self-contained TDD subframes are indicated in the DCI format for the DL assignment and the UL grant.

9. The apparatus of claim 8, wherein the number of self-contained TDD subframes within the aggregated self-contained TDD subframes are defined within one subset of the aggregated self-contained TDD subframes, wherein the subset is predefined or configured by higher layers via an extended master information block (xMIB), an extended system information block (xSIB), or a UE specific dedicated radio resource control (RRC) signalling.

10. The apparatus of claim 1, wherein a number of self-contained TDD subframes used for the xPDSCH or the xPUSCH data transmission within the aggregated self-contained TDD subframes are indicated via the extended xMIB, the extended xSIB, or a UE dedicated RRC signalling.

11. The apparatus of claim 10, wherein the number of self-contained TDD subframes used for the xPDSCH or the xPUSCH transmission is signaled via a dedicated signal or a channel in the DL data transmission.

12. The apparatus of claim 1, wherein the one or more processors and memory are further configured to:
   reuse a Physical Control Format Indicator Channel (PCFICH) to indicate a number of self-contained TDD subframes;
   use a physical TDD configuration indicator channel (PTCICH) to indicate the number of self-contained TDD subframes; or
   use a downlink control information (DCI) format, the xMIB, the xSIB, the UE dedicated RRC signalling, a dedicated signal or a channel in the DL data transmission, or a combination thereof to indicate a number of self-contained TDD subframes.

13. The apparatus of claim 1, wherein the one or more processors and memory are further configured to:
   predefine a subset of aggregated levels for the aggregated self-contained TDD subframes;
   use the PCFICH to indicate one of the aggregation levels in the subset;
   use cross-subframe scheduling and cross-carrier scheduling to schedule the xPDSCH or the xPUSCH for the aggregated self-contained TDD subframes; or employ an aggregated Hybrid automatic repeat request (HARQ) acknowledgement (ACK)/negative ACK (ACK/NACK) mechanism for one or more UEs scheduled within an aggregated self-contained TDD subframe window; wherein the one or more UEs feedback the HARQ ACK/NACK via the xPUCCH in a last subframe of the aggregated self-contained TDD subframe window, wherein a gap between the xPDSCH or the xPUSCH data transmission and HARQ ACK/NACK feedback is indicated in a downlink control information (DCI) format for a DL assignment or an UL grant.

14. The apparatus of claim 1, wherein a resource index for the HARQ ACK/NACK feedback on the xPUCCH is defined as a UE specific parameter, which is signaled via a UE specific RRC signalling, or the resource index for the HARQ ACK/NACK feedback on the xPUCCH is determined as a function of a subframe index within a maximum aggregation level and one or more parameters that include at least a De-Modulation Reference Signal (DM-RS) sequence index for an associated xPDSCH transmission or xPUSCH transmission.

15. The apparatus of claim 1, wherein the one or more processors and memory are further configured to:
use cross-carrier HARQ ACK/NACK feedback;
use a component carrier (CC) index for the HARQ ACK/NACK feedback transmission which is explicitly indicated in the DCI format for DL assignment or UL grant; or
use a UE specific RRC signalling, wherein a resource index for the HARQ ACK/NACK feedback on the xPUCCH is defined as a UE specific parameter which is signaled via the UE specific RRC signalling or determined as a function of the CC index for the data transmission and one or more parameters, that include at least a De-Modulation Reference Signal (DM-RS) sequence index for the associated xPDSCH transmission or xPUSCH transmission.

16. An apparatus of a user equipment (UE), the UE configured to communicate with an eNodeB, the apparatus comprising one or more processors and memory configured to:
process a downlink (DL) self-contained time division duplex (TDD) subframe, received from the eNodeB, comprising an extended physical downlink shared channel (xPDSCH), an extended physical D control channel (xPDCCH), a DL spacing signal, and a guard period, wherein the xPDSCH, the xPDCCH, the DL spacing signal, and the guard period are located within the DL self-contained TDD subframe prior to an extended physical uplink control channel (xPUCCH); and
generate, for transmission to the eNodeB, an uplink (UL) self-contained TDD subframe after an extended physical uplink shared channel (xPUSCH) having an UL spacing signal located before or after the xPUSCH.

17. The apparatus of claim 16, wherein the one or more processors and memory are further configured to process an indication, received from the eNodeB, for using aggregated self-contained TDD subframes.

18. The apparatus of claim 16, wherein the DL spacing signal is at least one of a broadcast signal, a sounding signal, a tracking signal, or a synchronization signal, and the UL spacing signal is at least one of the broadcast signal, the sounding signal, the tracking signal, or the synchronization signal, and wherein the DL spacing signal is inserted within the DL self-contained TDD subframe after the xPDSCH and prior to the guard period.

19. The apparatus of claim 18, wherein the DL self-contained TDD subframe contains one or more fields, the one or more fields include at least: the xPDCCH, the xPDSCH, the guard period; the UL spacing signal, and the xPUCCH; the xPDCCH, a first xPDSCH, a second xPDSCH, the guard period, and the xPUCCH; or the xPDSCH, the xPDCCH, the guard period, and the xPUCCH, wherein the xPDCCH is used to schedule the xPDSCH in a second DL self-contained TDD subframe.

20. The apparatus of claim 16, wherein the one or more processors and memory are further configured to:
process a hybrid automatic repeat request (HARQ)-acknowledgment (ACK) (HARQ-ACK) for the xPDSCH transmitted via the xPUCCH; or
process a first HARQ-ACK for the first xPDSCH transmitted via the xPUCCH in a first subframe and a second HARQ-ACK for the second xPDSCH via the xPUCCH in a second DL self-contained TDD subframe.

21. The apparatus of claim 16, wherein:
a number of self-contained TDD subframes used for the xPDSCH or the xPUSCH for data transmissions within the aggregated self-contained TDD subframes are indicated in the DCI format for the DL assignment and the UL grant;
the number of self-contained TDD subframes within the aggregated self-contained TDD subframes are defined within one subset of the aggregated self-contained TDD subframes, wherein the subset is predefined or configured by higher layers via an extended master information block (xMIB), an extended system information block (xSIB), or a UE specific dedicated radio resource control (RRC) signalling;
the number of self-contained TDD subframes used for the xPDSCH or the xPUSCH data transmission within the aggregated self-contained TDD subframes are indicated via the extended xMIB, the extended xSIB, or the UE dedicated RRC signalling;
the number of self-contained TDD subframes used for the xPDSCH or the xPUSCH transmission is signaled via a dedicated signal or a channel in the DL data transmission;
a Physical Control Format Indicator Channel (PCFICH) indicates the number of self-contained TDD subframes;
a physical TDD configuration indicator channel (PTCICH) indicates the number of self-contained TDD subframes; or
the DCI format, the extended xMIB, the extended xSIB, a UE dedicated RRC signalling, the dedicated signal or the channel in the DL data transmission, or a combination thereof indicates the number of self-contained TDD subframes.

22. The apparatus of claim 16, wherein:
a subset of aggregated levels for the aggregated self-contained TDD subframes is predefined;
the PCFICH indicates one of the aggregation levels in the subset;
the xPDSCH and the xPUSCH for the aggregated self-contained TDD subframes is scheduled using cross-subframe scheduling, cross-carrier scheduling, or a combination thereof; or
an aggregated Hybrid automatic repeat request (HARQ) acknowledgement (ACK)/negative ACK (NACK) mechanism is used for the UE and one or more additional UEs scheduled within an aggregated self-contained TDD subframe window; wherein the UE and the one or more one or more additional UEs each feedback the HARQ ACK/NACK via the xPUCCH in a last subframe of the aggregated self-contained TDD subframe window, wherein a gap between the xPDSCH or the xPUSCH data transmission and the HARQ ACK/NACK feedback is indicated in a DCI format for a DL assignment or an UL grant.

23. The apparatus of claim 16, wherein a resource index for the HARQ ACK/NACK feedback on the xPUCCH is defined as a UE specific parameter, which is signaled via a UE specific RRC signalling, or the resource index for the HARQ ACK/NACK feedback on the xPUCCH is determined as a function of a subframe index within a maximum aggregation level and one or more parameters including at least a De-Modulation Reference Signal (DM-RS) sequence index for an associated xPDSCH transmission or xPUSCH transmission.

24. The apparatus of claim 16, wherein the one or more processors and memory are further configured to:
use a cross-carrier for providing HARQ ACK/NACK feedback;
use a component carrier (CC) index for providing the HARQ ACK/NACK feedback indicated in the DCI format for DL assignment or UL grant, wherein a resource index for the HARQ ACK/NACK feedback on the xPUCCH is defined as a UE specific parameter which is signaled via the UE specific RRC signalling or determined as a function of the CC index for the data transmission and one or more parameters including at least a De-Modulation Reference Signal (DM-RS) sequence index for the associated xPDSCH transmission or the xPUSCH transmission.

25. The apparatus of claim 16, wherein the apparatus includes at least one of an antenna, a touch sensitive display screen, a speaker, a microphone, a graphics processor, an application processor, a baseband processor, an internal memory, a non-volatile memory port, and combinations thereof.

26. At least one non-transitory machine readable storage medium having instructions embodied thereon for an eNodeB to communicate with a User Equipment (UE), the instructions when executed cause the eNodeB to:
generate, for transmission to the UE, a downlink (DL) self-contained time division duplex (TDD) subframe comprising an extended physical downlink shared channel (xPDSCH), an extended physical downlink control channel (xPDCCH), a DL spacing signal, and a guard period, wherein the xPDSCH, the xPDCCH, the DL spacing signal, and the guard period are located within the DL self-contained TDD subframe prior to an extended physical uplink control channel (xPUCCH);
process, an uplink (UL) self-contained TDD subframe, received from the UE, having a UL spacing signal located before or after a 3GPP 5G physical uplink shared channel (xPUSCH);
schedule DL data transmission and UL data transmission using aggregated self-contained TDD subframes; and
process, for transmission to the UE, an indication for using the aggregated self-contained TDD subframes.

27. The at least one machine readable storage medium of claim 26, wherein the plurality of signal types include at least a downlink (DL) sounding reference signal (SRS), channel state information reference signal (CSI-RS), a broadcast signal, and a synchronization signal.

28. The at least one non-transitory machine readable storage medium of claim 26, further comprising instructions which when executed cause the eNodeB to:
separate a cyclic redundancy check (CRC) attachment an the first xPDSCH and the second xPDSCH within a same DL self-contained TDD subframe;
process, for transmission to the UE, a hybrid automatic repeat request (HARQ)-acknowledgment (ACK) (HARQ-ACK) for the xPDSCH;
use a Physical Control Format Indicator Channel (PCFICH) to indicate a number of self-contained TDD subframes,
use a physical TDD configuration indicator channel (PTCICH) to indicate the number of self-contained TDD subframes;
use a DCI format, an extended master information block (xMIB), an extended system information block (xSIB), or a UE specific dedicated radio resource control (RRC) signalling, a dedicated signal or a channel in the DL data transmission, or a combination thereof to indicate the number of self-contained TDD subframes;
predefine a subset of aggregated levels for the aggregated self-contained TDD subframes; or
use a Physical Control Format Indicator Channel (PCFICH) to indicate one of the aggregation levels in the subset.

29. The at least one non-transitory machine readable storage medium of claim 26, further comprising instructions which when executed cause the eNodeB to:
use cross-subframe scheduling and/or cross-carrier scheduling to schedule the xPDSCH and the xPUSCH for the aggregated self-contained TDD subframes; or
employ an aggregated Hybrid automatic repeat request (HARQ) acknowledgement (ACK)/negative ACK (NACK) mechanism for one or more UEs scheduled within an aggregated self-contained TDD subframe window, wherein the one or more UEs feedback the HARQ ACK/NACK via the xPUCCH in a last subframe of the aggregated self-contained TDD subframe window, wherein a gap between the xPDSCH or the xPUSCH data transmission and HARQ ACK/NACK feedback is indicated in the DCI format for the DL assignment or the UL grant.

30. The at least one non-transitory machine readable storage medium of claim 26, further comprising instructions which when executed cause the eNodeB to:
use cross-carrier HARQ ACK/NACK feedback; or
use a component carrier (CC) index for the HARQ ACK/NACK feedback transmission is explicitly indicated in the DCI format for DL assignment or UL grant, wherein a resource index for the HARQ ACK/NACK feedback on the xPUCCH is defined as a UE specific parameter which is signaled via the UE specific RRC signalling or determined as a function of the CC index for the data transmission and one or more parameters including De-Modulation Reference Signal (DM-RS) sequence index for the associated xPDSCH or xPUSCH transmission.

\* \* \* \* \*